(12) United States Patent
Taylor

(10) Patent No.: US 12,014,458 B2
(45) Date of Patent: *Jun. 18, 2024

(54) METHOD, APPARATUS AND SYSTEM FOR LINING CONDUITS

(71) Applicant: Perma-Liner Industries, LLC, Clearwater, FL (US)

(72) Inventor: Kevan Taylor, Largo, FL (US)

(73) Assignee: Perma-Liner Industries, LLC, Clearwater, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/497,589

(22) Filed: Oct. 30, 2023

(65) Prior Publication Data

US 2024/0060591 A1  Feb. 22, 2024

Related U.S. Application Data

(63) Continuation of application No. 18/326,143, filed on May 31, 2023, now Pat. No. 11,802,647, which is a
(Continued)

(51) Int. Cl.
*G06T 15/06* (2011.01)
*B29C 35/08* (2006.01)
(Continued)

(52) U.S. Cl.
CPC .............. *G06T 15/06* (2013.01); *B29C 63/36* (2013.01); *F16L 55/1651* (2013.01); *G06T 1/20* (2013.01);
(Continued)

(58) Field of Classification Search
CPC ..... F16L 55/1651; F16L 55/18; F16L 55/165; F16L 55/1652; F16L 55/1653;
(Continued)

(56) References Cited

U.S. PATENT DOCUMENTS 4,009,063 A   2/1977   Wood
4,064,211 A   12/1977  Wood
(Continued)

FOREIGN PATENT DOCUMENTS

AU   2018316705 A1   4/2020
DE   102015200149 A1  7/2016
(Continued)

OTHER PUBLICATIONS

Pro-Kanal article found on p. 10 of the Ro-Ka-Tech Journal published Feb. 2015. Journal publication available at https://www.yumpu.com/de/document/read/63066729/ausgabe-02-2015. Applicant is submitting the original article in German followed by a machine translation in English.
(Continued)

*Primary Examiner* — Philip C Tucker
*Assistant Examiner* — Brian R Slawski
(74) *Attorney, Agent, or Firm* — Nyemaster Goode, P C.

(57) ABSTRACT

Methods, apparatus or equipment and systems for lining conduits, e.g., preferably subterranean pipelines and passageways, such as sewers, with a liner impregnated with a curable resin in order to secure the conduit against ingress or egress of liquids.

21 Claims, 12 Drawing Sheets

Related U.S. Application Data continuation of application No. 16/639,886, filed as application No. PCT/US2018/000335 on Aug. 23, 2018, now Pat. No. 11,674,628.

(60) Provisional application No. 62/547,690, filed on Aug. 18, 2017.

(51) Int. Cl.

| | | |
|---|---|---|
| *B29C 63/36* | (2006.01) | |
| *B29C 65/00* | (2006.01) | |
| *B29C 65/14* | (2006.01) | |
| *B29C 65/48* | (2006.01) | |
| *F16L 55/165* | (2006.01) | |
| *G06T 1/20* | (2006.01) | |
| *G06T 17/00* | (2006.01) | |

(52) U.S. Cl.
CPC .... *G06T 17/005* (2013.01); *B29C 2035/0827* (2013.01); *B29C 65/1406* (2013.01); *B29C 65/4845* (2013.01); *B29C 66/301* (2013.01); *B29C 66/5221* (2013.01); *B29C 66/612* (2013.01); *G06T 2210/12* (2013.01)

(58) Field of Classification Search
CPC ...... F16L 55/1654; B29C 63/36; B29C 63/00; B29C 63/0004; B29C 63/0073; B29C 63/18; B29C 63/185; B29C 63/20; B29C 63/34; B29C 2035/08237; B29C 2035/0833; B29C 65/4845; B29C 65/02; B29C 65/1406; B29C 66/5221; B29C 66/612; B29C 66/301
USPC .......... 156/71, 94, 156, 272.2, 275.5, 275.7, 156/285, 287, 293, 294, 296, 349, 379.6, 156/379.8, 391, 423, 494, 538, 539, 543, 156/556, 574; 138/97, 98
See application file for complete search history.

(56) References Cited

U.S. PATENT DOCUMENTS

| | | |
|---|---|---|
| 4,135,958 A | 1/1979 | Wood |
| 4,581,247 A | 4/1986 | Wood |
| 4,668,125 A | 5/1987 | Long, Jr. |
| 4,680,066 A | 7/1987 | Wood |
| 4,685,983 A | 8/1987 | Long, Jr. |
| 4,687,677 A | 8/1987 | Jonasson |
| 4,752,511 A | 6/1988 | Driver |
| 4,768,562 A | 9/1988 | Strand |
| 5,010,440 A | 4/1991 | Endo |
| 5,019,417 A | 5/1991 | Northcutt |
| 5,044,405 A | 9/1991 | Driver et al. |
| 5,154,936 A | 10/1992 | Driver et al. |
| 5,407,630 A | 4/1995 | Smith |
| 5,451,351 A | 9/1995 | Blackmore |
| 5,606,997 A | 3/1997 | Blackmore et al. |
| 5,915,419 A | 6/1999 | Tweedie et al. |
| 5,937,910 A | 8/1999 | Chandler |
| 5,969,234 A | 10/1999 | Weigele |
| 6,029,726 A | 2/2000 | Tweedie et al. |
| 6,044,867 A | 4/2000 | Tweedie et al. |
| 6,068,725 A | 5/2000 | Tweedie et al. |
| 6,170,531 B1 | 1/2001 | Jung et al. |
| 6,354,330 B1 | 3/2002 | Wood |
| 6,390,795 B1 | 5/2002 | Waring et al. |
| 6,539,979 B1 | 4/2003 | Driver |
| 6,641,687 B2 | 11/2003 | Kiest et al. |
| 6,679,293 B2 | 1/2004 | Driver |
| 6,682,668 B1 | 1/2004 | Driver et al. |
| 6,708,728 B2 | 3/2004 | Driver et al. |
| 6,827,526 B2 | 12/2004 | Warren |
| 6,837,273 B2 | 1/2005 | Woolstencroft et al. |
| 7,131,791 B2 | 11/2006 | Whittaker et al. |
| 7,523,764 B2 | 4/2009 | Lepola et al. |
| 7,845,372 B2 | 12/2010 | Kiest, Jr. |
| 8,394,464 B2 | 3/2013 | Bailey et al. |
| 8,561,662 B2 | 10/2013 | Moeskjaer et al. |
| 8,580,364 B2 | 11/2013 | Quitter |
| 8,715,442 B2 | 5/2014 | Kamiyama et al. |
| 9,056,425 B2 | 6/2015 | Taylor et al. |
| 9,074,720 B2 | 7/2015 | D'Hulster |
| 9,163,770 B2 | 10/2015 | Kiest, Jr. et al. |
| 9,188,289 B2 | 11/2015 | Peil et al. |
| 9,248,605 B2 | 2/2016 | Quitter |
| 9,334,998 B2 | 5/2016 | Duttenhoefer |
| 9,360,200 B2 | 6/2016 | Peil et al. |
| 9,423,064 B2 | 8/2016 | Mathey et al. |
| 9,435,710 B2 | 9/2016 | Zuegel |
| 9,453,607 B2 | 9/2016 | Moeskjaer et al. |
| 9,772,059 B2 | 9/2017 | Mathey |
| 9,863,569 B2 | 1/2018 | Czaplewski et al. |
| 9,982,828 B2 | 5/2018 | Kiest, Jr. et al. |
| 10,093,527 B2 | 10/2018 | Reedy |
| 10,099,251 B2 | 10/2018 | Kersey et al. |
| 10,100,963 B2 | 10/2018 | Kiest, Jr. et al. |
| 10,113,672 B2 | 10/2018 | Fasel et al. |
| 10,155,328 B2 | 12/2018 | Smith et al. |
| 10,247,348 B2 | 4/2019 | Meier |
| 10,300,656 B2 | 5/2019 | Pleasants et al. |
| 10,309,572 B2 | 6/2019 | Mathey et al. |
| 10,330,236 B2 | 6/2019 | Czaplewski et al. |
| 10,337,659 B2 | 7/2019 | KUniar |
| 10,343,338 B2 | 7/2019 | KUniar |
| 10,591,102 B2 | 3/2020 | Mathey et al. |
| 10,611,059 B2 | 4/2020 | KUniar |
| 10,695,972 B2 | 6/2020 | Pleasants et al. |
| 10,808,875 B2 | 10/2020 | Lindelof et al. |
| 10,941,895 B2 | 3/2021 | Czaplewski et al. |
| 11,041,587 B2 | 6/2021 | Liu et al. |
| 11,118,716 B2 | 9/2021 | Kanres |
| 11,655,928 B2 | 5/2023 | Krasowski |
| 11,674,628 B2 | 6/2023 | Taylor |
| 11,802,647 B2 | 10/2023 | Taylor |
| 2007/0165404 A1 | 7/2007 | Cheng |
| 2010/0012214 A1 | 1/2010 | Kamiyama et al. |
| 2010/0154187 A1 | 6/2010 | Kamiyama et al. |
| 2010/0308510 A1 | 12/2010 | Reutemann |
| 2015/0045527 A1 | 2/2015 | Schleicher et al. |
| 2015/0140228 A1 | 5/2015 | Kersey et al. |
| 2016/0053572 A1 | 2/2016 | Snoswell |
| 2016/0327701 A1 | 11/2016 | Pretsch et al. |
| 2018/0229404 A1 | 8/2018 | Starr et al. |
| 2018/0264518 A1 | 9/2018 | Shrode et al. |
| 2018/0281241 A1 | 10/2018 | Schropp et al. |
| 2018/0328528 A1 | 11/2018 | Weisenberg |
| 2019/0137026 A1 | 5/2019 | Kiest, Jr. et al. |
| 2020/0182391 A1 | 6/2020 | Kennard et al. |
| 2020/0224812 A1 | 7/2020 | Krasowski |
| 2020/0300403 A1 | 9/2020 | Taylor |
| 2022/0063146 A1 | 3/2022 | Schropp et al. |

FOREIGN PATENT DOCUMENTS

| | | |
|---|---|---|
| EA | 035944 B1 | 9/2020 |
| EP | 2141405 A1 | 1/2010 |
| GB | 1563424 A | 3/1980 |
| JP | 2010149285 A | 7/2010 |
| JP | 5534585 B2 | 7/2014 |
| MX | 2007007912 A | 12/2007 |
| WO | 2018188698 A1 | 10/2018 |
| WO | 2019072900 A1 | 4/2019 |
| WO | 2020011934 A1 | 1/2020 |

OTHER PUBLICATIONS

Screen Captures From Youtube Video Clip Entitled "Master Gun by Pro-Kanal," 5 pages, uploaded/published on Aug. 3, 2015 by user "Firma Pro-Kanal GmbH". Retrieved from Internet: <https://www.youtube.com/watch?v=ly09_MntHE&t=3s>.

(56) References Cited

OTHER PUBLICATIONS

PCT/US2018/00335 International Search Report and Written Opinion dated Feb. 4, 2019.
Screen Captures From Youtube Video Clip Entitled "Pro-Kanal-UV hardening-Short Liner System," 5 pages, uploaded/published on Jan. 11, 2018 by user "Firma Pro-Kanal GmbH". Retrieved from Internet: <https://www.youtube.com/watch?v=RZD17r_ISQ0&t=91s>.
CCUV Technology data sheet. Author and earliest publication date are not known. Accessed by Applicant on Mar. 29, 2023. Available at the Pro-Kanal website at https://www.pro-kanal.de/download-eng/.
Examination Report for Australian Patent Application No. 2018316705 dated Jan. 16, 2023.
Main Pipe To data sheet. Author and earliest publication date are not known. Accessed by Applicant on Mar. 29, 2023. Available at the Pro-Kanal website at https://www.pro-kanal.de/download-eng/.
Master-Gun data sheet. Author and earliest publication date are not known. Accessed by Applicant on Mar. 29, 2023. Available at the Pro-Kanal website at https://www.pro-kanal.de/download-eng/.
D2: Donaldson, B.M. Water Quality Implications of Culvert Repair Options: Vinyl Ester Based and Ultraviolet Cured-in-Place Pipe Liners, Virginia Center for Transportation Innovation and Research (2012) [online][Retrieved online Jan. 16, 2023]<URL: https://www.virginiadot.org/vtrc/main/online_reports/pdf/13-r2.pdf> Published Nov. 2012 & <URL: https://rosap.ntl.bts.gov/view/dot/25373>.
Pro-Kanal advertisement found on p. 51 of the Ro-Ka-Tech Journal published Jan. 2015. Journal publication available at https://www.yumpu.com/de/document/read/63065916/ausgabe-01-2015 on p. 51. Applicant is submitting the original advertisement in German followed by a machine translation in English.

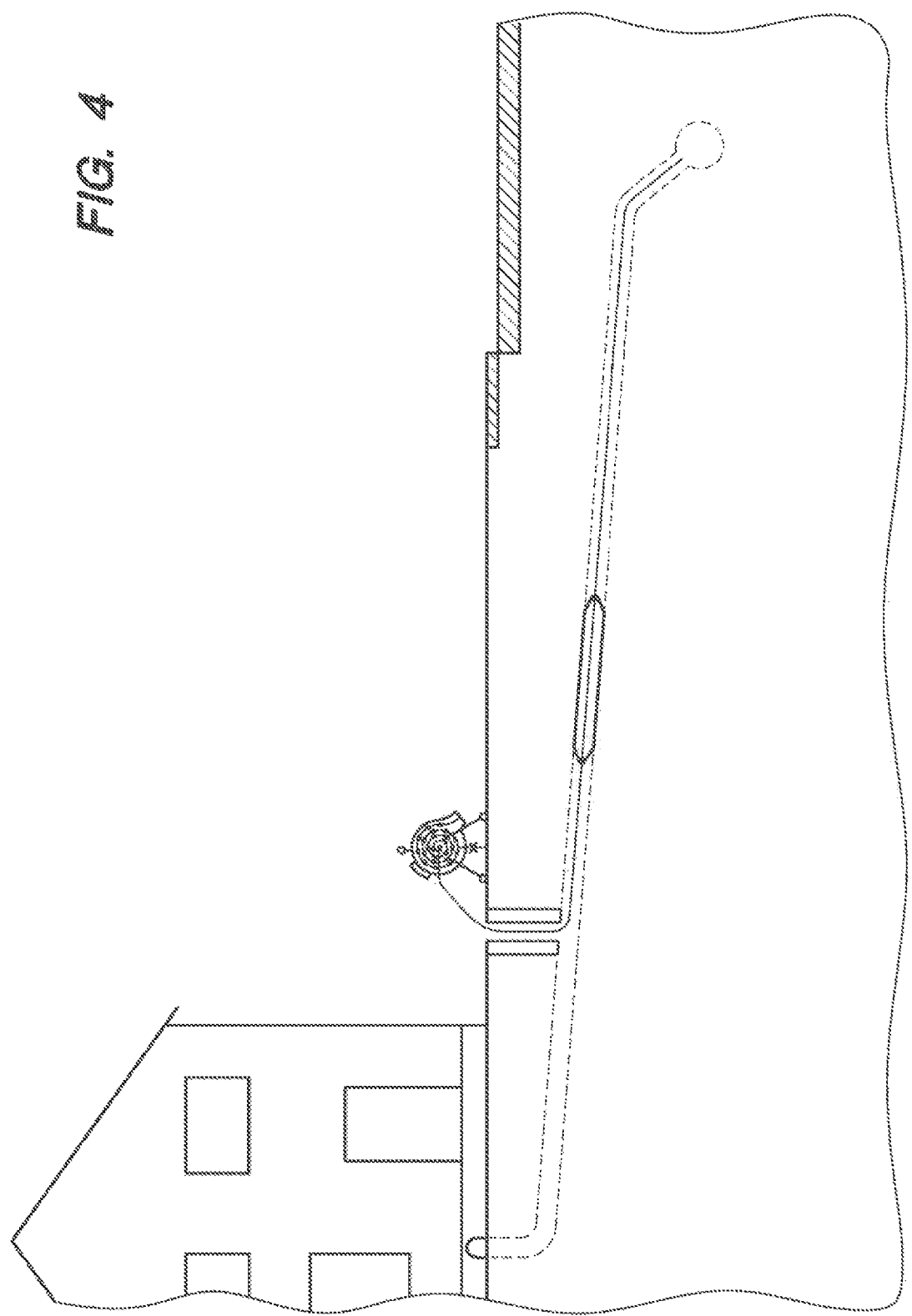

METHOD, APPARATUS AND SYSTEM FOR LINING CONDUITS

RELATED APPLICATIONS

This application is a continuation of U.S. Pat. No. 11,802,647 issued on Oct. 31, 2023, which is a continuation of U.S. Pat. No. 11,674,628 issued on Jun. 13, 2023, which is a national stage application claiming the benefit of priority from International Patent Application No. PCT/US18/00335 filed Aug. 20, 2018, which claims the benefit of priority from U.S. Provisional Patent Application No. 62/547,690 filed on Aug. 18, 2017, the disclosures of which are hereby incorporated by reference in their entirety.

FIELD OF THE INVENTION

The present invention relates to methods, apparatus or equipment and systems for lining conduits, e.g., preferably subterranean pipelines and passageways, such as sewers, with a liner impregnated with a curable resin in order to secure the conduit against ingress or egress of liquids.

BACKGROUND OF THE INVENTION

Subterranean passageways that have been in use for many years tend to become permeable, thus permitting fluids to seep into and out of the passageways. The necessary repair of such passageways is both an expensive and time-consuming operation. Systems of lining passageways that use a fabric impregnated with curable resin have been used for a number of years. Such systems and methods of lining passageways are disclosed, for example, in U.S. Pat. Nos. 4,009,063; 4,064,211; 4,135,958; 4,685,983; 4,668,125; 6,679,293; 5,154,936; Re. 35,944; 6,390,795; 4,752,511; 5,044,405; 6,708,728; 6,354,330; 6,682,668; 6,827,526; 6,641,687; and 5,969,234. Each of the foregoing references is incorporated by reference herein.

U.S. Pat. No. 4,009,063 to Wood discloses a method of lining a passageway, wherein a tubular fibrous felt is immersed at the passageway site in a thermosetting resin. The resulting resin-impregnated felt has an inflatable tube therein which is inflated to shape the resin to the passageway surface. As the tube is lowered into the passageway (e.g., a sewer), the tube is pulled along the passageway by winding up a rope attached to a leading end of the tube onto a hand winch. The tube can be inflated, e.g., with air under pressure from a fan or blower. With the tube so inflated, the uncured resin is either allowed to cure naturally or is cured under the action of heat depending upon the type of resin used. The resin is cured to form a hard, rigid lining pipe with the felt embedded therein.

U.S. Pat. No. 4,064,211 to Wood discloses a method for lining passageways, wherein a resin-impregnated foam or felt in the form of a flattened tube liner is anchored at one end of a passageway and fed into the passageway being turned inside out as it is fed in. Before the liner is turned inside out, it is supported buoyantly by liquid, e.g., water, which serves to carry the liner. The liquid also forces the tube to roll inside out inside the passageway, the uneverted portion being suspended in the liquid. When the tube is partially filled with and floats on the liquid, the remainder of the tube may be filled with air under pressure. After the complete lining of the passageway, an outer barrier layer of the tube may be removed therefrom.

U.S. Pat. No. 4,135,958 to Wood discloses a method of lining a passageway with a resin absorbent tube, involving causing a tube of resin absorbent material to evert into the passageway by applying fluid pressure to the interior of the everted tube to force the uneverted portion of the tube to move into the passageway through the everted portion of the tube; causing a reservoir of resin to be located in the uneverted portion of the tube which is just behind the portion of the that is everting into the passageway, whereby the resin absorbent material is soaked by the resin in the reservoir just before that material everts; and supporting the uneverted tube at the location of the reservoir of resin by means that move along the passageway as the tube everts, e.g., a balloon or gas-filled bag.

U.S. Pat. No. 4,685,983 to Long, Jr. discloses a method and apparatus for installing a flexible tubular liner into a pipe, by means of pressurized air. Wherein the apparatus includes means for defining a pressurized region for inserting the liner into the pipe and an insertion conduit, having an entry end and exit end connected to the means defining the pressurized region. Means are provided on the exit end of the insertion conduit for sealing and clamping the leading end of the liner to the exit end of the insertion conduit and for creating a fluid tight seal between the liner and the insertion conduit. The liner is installed within a sewer pipe by securing the leading end of the liner to a fixed structure adjacent to one end or within the sewer pipe and by inverting the liner or turning the liner inside out along the length of the sewer pipe. Once the liner reaches the halfway point in the insertion process, all of the liner is located within the sewer pipe. The apparatus functions to insert the liner within the sewer pipe using fluid pressure, which can be a combination of water pressure and air pressure. Air pressure is made to act upon a column of water placed in the insertion conduit to push downwardly a cuffed leading edge of the liner, thereby causing the liner to invert and move the turned back portion of the liner toward the left along the sewer pipe. Pressurized fluid flows through the pressure conduit to facilitate the bending of the liner through the diversion angle. The inversion and movement of the liner along the sewer pipe continues until the inversion end reaches and abuts against a stop means, which has been placed inside of the sewer pipe at the end of the section of pipe to be lined. Static water pressure forces the liner radially outwardly against the walls of the sewer pipe. Hot water is pumped through a hot water pipe into the hose, which extends along the length of the liner. Through this circulation process, the water temperature within the liner is slowly raised to a temperature sufficient to effect curing of the liner resin.

U.S. Pat. No. 4,668,125 to Long, Jr. discloses a self-contained, transportable apparatus for inserting a flexible liner into a pipe, wherein the apparatus includes an inversion means or insertion conduit, and means for sealing and clamping a leading end of the liner with a fluid tight seal to the insertion conduit or inversion means. The apparatus further includes a water pipe secured to one side of the insertion conduit and adapted to be connected to a source of water, and a plurality of water valves located along the length of the water pipe to control the flow of water through the water pipe. During use of the apparatus, the leading end of the liner is moved down the insertion conduit until it extends out of the exit end of the pipe. The leading end of the liner is then turned inside out for the first six inches to form a cuff which is pulled back over the outside of the insertion conduit exit end and is secured using a clamping means. The water valves are then opened to allow water to flow through the water pipe and to enter the top of the insertion conduit. Because the leading end of the liner is secured to the insertion conduit exit end, the water will be contained within the insertion conduit and will fill the insertion conduit. As the water pressure within the insertion conduit builds up to a predetermined level, the water pressure causes the liner to invert and move along the pipe. The water continues to flow into the insertion conduit to maintain the water pressure at a level sufficient to move the liner along the pipe. When a trailing end of the liner reaches the insertion conduit entry end, the operation is stopped and a rope is secured to the trailing end of the liner. When the liner has been completely inverted and inserted into the pipe, the liner is cured.

U.S. Pat. No. 6,679,293 to Driver discloses a process for lining an existing pipeline with a flexible resin impregnated cured in place liner by pulling in the liner and inflating an eversion bladder with air and curing the liner with flow-through steam without loss of pressure. The bladder is everted by means of pressurized air. Steam is introduced into the bladder to cure the resin, after which the bladder is removed.

U.S. Pat. No. 5,154,936 and Re. 35,944, both to Driver et al., disclose a tube eversion apparatus for use in lining passageways, e.g., underground sewer pipes, wherein the apparatus is composed of a housing having an open top and an open bottom through which a tube to be everted can pass. The housing is composed of first and second chambers communicating with one another by a passage defined at least in part by a flexible wall, through which passage the tube is adapted to pass with the flexible wall in engagement therewith. The housing further includes a third chamber with the flexible wall defining a surface thereof. The housing also contains a means for supplying fluid to the first chamber, means for supplying fluid at an elevated pressure to the second chamber, thereby to evert the tube out from the apparatus, and means for supplying fluid at an elevated pressure to the third chamber, thereby to press the flexible wall against the tube as the tube moves through the passage, so as to substantially rate the first and second chambers and to retain the elevated fluid pressure in the second chamber.

The flexible wall may extend substantially completely around the passage, thereby forming a sphincter valve which is moved to a closed, tube-engaging position by the fluid pressure in the third chamber. The fluid used to provide the pressure to evert the tube is preferably water. The pressure provided to the third chamber is preferably air pressure and is selected to effectively substantially seal off the upper end of the third chamber (thus separating the first and second chambers) while permitting the tube to slide there through.

U.S. Pat. No. 6,390,795 to Waring et al. discloses an apparatus for use in installing a liner in a conduit as part of a repair procedure, wherein the apparatus includes a sealing inlet port for passage of the tubular liner into an enclosed zone where an increased fluid pressure is maintained to move the tubular liner into the conduit and to evert it as it moves along the conduit. The apparatus also includes a container for holding air or another fluid under pressure to act on the flexible tube. The sealing inlet port is provided in the container to allow the liner to enter the container in a flattened configuration without significant loss of pressure, so that the pressure of the fluid in the container can be used to evert and extend the tubular liner into the required position within a conduit.

U.S. Pat. No. 4,752,511 to Driver discloses a method and apparatus for sealing the space between a pipe and a lining applied to the pipe's interior, wherein sealing rings are provided between the lining and the pipe to prevent fluid from passing through spaces between the pipe and the lining. The patent further teaches that water or other fluid is used to evert the liner into and along the interior of the pipe.

U.S. Pat. No. 5,044,405 to Driver et al. discloses a method and apparatus for repairing short sections of pipe by lining them. The patent teaches that patch type repair is accomplished by locating the lining within a carrier, which is inserted into the pipe to be repaired, and moved to a position adjacent the length to be lined. The lining is then moved out from the carrier into position within the pipe, with the carrier providing means for pressing the lining against the interior of the pipe and causing it to assume final form. After the lining is formed in situ, the carrier is separated therefrom and removed from the pipe, ready for reuse. To remove the lining from the carrier, fluid pressure is applied to the liner to cause it to evert and move away from the carrier.

U.S. Pat. No. 6,708,728 to Driver et al. discloses a "pull in and inflate" method for lining a pipeline with a flexible resin impregnated cured in place liner. Liner is pulled into a pipeline section to be relined by pulling in the liner and inflating an eversion bladder with air and curing the liner with flow-through steam introduced in the bladder. After curing is completed, the bladder is removed.

U.S. Pat. No. 6,354,330 to Wood discloses a method of lining a pipeline with a lining tube or resin absorbent material impregnated with a curable synthetic resin, wherein a lining tube is inserted into the pipeline and urged by pressure against the pipeline and heat is applied in stages to lengths of the lining tube. Water is used to evert the lining tube in the pipeline.

U.S. Pat. No. 6,682,668 to Driver et al. discloses a process for lining an existing pipeline with a flexible resin impregnated cured in place liner by pulling in the liner and inflating it with a reusable endless inflation bladder. The bladder is everted by means of water.

U.S. Pat. No. 6,827,526 to Warren discloses an assembly for installing a pipe liner within a sewer pipe, wherein the assembly includes a launcher defining a passage through which the pipe liner and a bladder pass during installation into a branch line sewer pipe. An inflatable member is mounted to an outer diameter of the launcher and is actuatable between an inflatable condition and a deflated condition. The inflatable member defines an airtight cavity into which air is introduced by way of an air inlet. A carrier tube is attached to the launcher body to provide protected passage for the pipe liner and bladder tube. A seal is provided between the launcher and the carrier tube. During installation of the pipe liner into a sewer pipe, the bladder is cuffed around the inflatable member and clamped around the outer surface of the launcher, and the pipe liner is then cuffed over the inflatable member on the outside of the bladder. The pipe liner is impregnated with a curable resin before being installed onto the launcher. The launcher is then attached to a positioning device (e.g., a rotating/lifting machine or a system of cables including pulleys and cables attached to the launcher and operated to pull and guide the launcher) for movement into position within the sewer pipe. The positioning device and the launcher are inserted into the main line of the sewer pipe and the launcher is positioned relative to a discrete location within the sewer pipe. The inflatable member is then inflated to trap the bladder and the pipe liner against the inner surface of the pipe. Air pressure is then applied to the bladder through the carrier tube to drive the bladder and the pipe liner into the main line sewer pipe, which causes the entire length of the pipe liner to be drawn through the passage defined in the launcher. The inflatable member is then deflated, but the bladder remains inflated until the pipe liner hardens. Once the pipe liner hardens, the bladder tube is deflated and the launcher removed from the sewer pipe.

U.S. Pat. No. 6,641,687 to Kiest, Jr. discloses a pipe repair apparatus, which includes an outer carrier tube, an inner bladder tube within the carrier tube, and a repair sleeve within the bladder tube. The bladder tube and the carrier tube are formed by one unitary tube, which is folded back upon itself. A wick extends from the repair sleeve to the rear end of the bladder tube and permits evacuation of gases from the bladder tube when the bladder tube is flattened by a vacuum during insertion of a curable resin into the bladder tube at its forward end. The bladder tube can be inverted out of the carrier tube so as to place the repair sleeve in contact with an area to be repaired within a sewer pipe.

U.S. Pat. No. 5,969,234 to Weigele discloses an apparatus for repairing and/or leakage testing of sewer pipes, wherein the apparatus is constructed as a tubular member surrounded by an elastic element, the apparatus further having an opening and a bladder. The bladder can be expanded by means of an arbitrary medium, e.g., gas, air, or a liquid. Supporting wheels permit movement of the apparatus inside the sewer pipe. For repair of a damaged connecting point of a connecting pipe adjoining a sewer pipe, the opening in the apparatus is aligned with the damaged connecting point. An interspace in the apparatus is filled with a medium, e.g., air, thereby causing the elastic element to expand and fill up the interspace. The elastic element bears against the sewer pipe inner wall and moves the apparatus up against the sewer pipe inner wall. The bladder is moved out through the opening into the connecting pipe and inflated, thereby causing the bladder to bear against the inner wall of the pipe and form a seal. Filler is then pressed into the region of the damaged connecting point and cured. The bladder is then reeled back into the tubular member of the apparatus and the medium is let out of the interspace, thereby causing the tubular member to sink downward.

A drawback observed in many current pipelining systems is the need to use a thermal curing resin to impregnate the tubular liner, as it is then necessary to maintain the resin at a significantly reduced temperature in order to retard or hold back the curing process until the liner is fully inserted into the intended conduit or pipeline. To maintain the resin-impregnated liner at such reduced temperatures, the liner is initially cooled at a centralized liner preparation facility. During storage and/or transportation of the resin-impregnated liner from the liner preparation facility and the conduit to be lined, the liner has to be kept under refrigeration. In this way, the liners can be transported a substantial distance to the remote job site, hopefully without any curing of the resin during transportation. By using a centralized facility for the preparation of the liner, the same equipment can be used to impregnate and otherwise prepare liners concurrently for different jobs at widely separated job sites, however this is all extremely risky and very expensive.

Suitable resin concentration in the impregnated liner is determined at least in part by the natural ability of the fabric material to absorb the various resin liquids used in the impregnation, which again depends on the current temperatures as the resin viscosity also changes with temperature at which the impregnation and the rate of impregnation can occur. These rates will change depending on the materials, resin (e.g., resin viscosity) and fabric (e.g., fabric density) used. To then use a thermo-setting or heat activated catalyst resin, which may have to be stored for many weeks inside refrigerated containers or trucks (since the stability is very limited), results in the shelf life being unreliable due to the thermal-activators utilized in the systems of the prior art. Another major issue with this type of heat curing system occurs mainly in gravity sewer pipes and deep conduits, and this is the effect of cold groundwater creating a cold sink temperature drop that may interfere with the curing process of these liners, and cold groundwater issues surrounding these underground pipes are mostly unknown or hidden until the pipe is under internal pressure and these factors can cause very serious delays or dramatically extend the curing cycle, and this effect can be devastating, and in some instances, the liner does not fully cure causing another problem which is the now soft uncured portion of liner forms into a blockage within the flow-line of the pipe and is called a "lift" in the liner which, then has to be excavated as an emergency repair.

The use of a true ambient thermal cured resin which also has very similar groundwater or temperature related issues, and as such that in most cases it's completely impractical, unless the process is used for a smaller length and diameter pipe or for a short-sectional repair (a short length of tubular liner), used for all diameters that only requires a partial repair to a section of the damaged conduit or pipe, or indeed to repair a section of previously failed liner), this is due to the volume of resins normally required, and of the critical amounts of ambient activator/catalyst needed when this process is chosen, the temperature of the resin, chemicals along with the liner have to be carefully monitored or controlled, and then the liner has to be installed immediately upon the completion of the mixing and saturation of the liner due to these critical relationships of mass resin/catalyst and the predicted time to cure that's now affected immediately by the surrounding temperatures. Another drawback to this method is that once the process of mixing has begun, the installation work cannot stop even for an emergency as the liner may start to cure prematurely, and for a number of reasons, but mostly related to temperatures and therefore this type of operation typically has to take place directly on site with very high risks and costs.

Another drawback which has created many documents and papers from leading environmental groups, has been the concern and associated risks with the release of a carcinogen namely "styrene" into waterways or areas of aquatic life, most current pipelining materials have an outer coating or membrane which when the liner is inverted into place then becomes the inside surface of the new pipe and this coating/membrane typically allows for the styrene gas to mitigate into the pipe while curing, this practice is very dangerous, highly toxic to aquatic life downstream, and the odors can be very overcoming in close confinements.

Finally, it is both time consuming and very costly when these liners have to be installed completely before the mechanism for curing or initiating the resin to cure by heating is started, therefore more expensive equipment, additional labor and time are required and necessary to make these types of repairs for conduits or passageways of varying lengths and diameters.

It is desirable, therefore, to provide a new method, material and apparatus for installing these curable liners without any costly refrigeration transportation, expensive heating trucks and equipment. It is also desirable, therefore, to provide a new method, material and apparatus for installing smaller diameter liners without any risk of temperature, environmental and differing site conditions from prematurely curing the liner or adding to the timing of the curing process, due to unpredictable risks associated with geographical weather variations, unknown underground conditions and vulnerability, furthermore by removing the associated costs and risks of any possible temperature variations from the installation method and practice, and thereby removing potential safety and quality control issues associated with the on-site mixing of liquid resins, retarding agents and temperature activated catalysts when attempting to impregnate or resin saturate the tubular liners on site. It is also desirable, therefore, to provide a new method, material and apparatus for installing these liners which can be cured in position without being affected by any unforeseen temperature effects or environmental issues, it is also desirable to start the curing of the resin saturated liner during the installation and prior to it being fully installed, thereby speeding up the entire process for any diameter of conduit or subterranean passageways and in any direction or grade that is used to carry liquids or gas, such as sewage, in which the interruption of the passageway is minimized.

SUMMARY OF THE INVENTION

The present invention is directed, in part, to a method for inverting a tubular liner in a hollow conduit, particularly a subterranean passageway or pipeline, e.g., a sewer pipe, storm drain, and the like. In addition, the present invention is directed to a method for lining a hollow conduit with a resin-impregnated tubular liner and a flexible light curing activator tube, an apparatus for inverting a translucent tubular bladder in a hollow conduit while inserting the flexible light activator tube to cure the liner as it is installed. In addition, the present invention is directed to a method for pulling or placing a resin-impregnated tubular liner along with the flexible light activator tube and a translucent bladder together in unison as one device, for the tubular lining of a hollow conduit or a partial section of it. The methods are much simpler and faster than conventional methods for inverting or placing a liner in a conduit and for the curing of the resin impregnated liner, the methods and apparatus are more consistent and with less risks for use in an underground hollow conduit. Optionally the methods, apparatus and system of the invention allow for the liner to be curing as the inversion or installation procedure takes place. In another aspect of the present invention, the methods, apparatus and systems also minimize all the known associated risks and costs by removing temperature as part of the equation in relation to heat assisted or ambient curing thermal resin mechanisms, and all of their related costs along with the risks associated in the transportation, as well as the potential time factors for the intended conduit to be closed or by-passed during the installation process and the curing stage of the resin-impregnated liner.

In one aspect, the present invention provides a method for inverting a tubular liner in a hollow conduit comprising:
(a) forming a cuff from a leading end of an apparatus that has an additional opening and securing the cuff of the tubular liner to the leading opening of the apparatus;
(b) feeding a remainder of the tubular liner through the opening in the cuff under pressure of a gas;
(c) sealing or clamping a region of the tubular liner after the cuff, once a portion of the tubular liner has been inverted within the hollow conduit, to ensure that the gas pressure inside the inverted portion of the tubular liner is maintained;
(d) attaching a trailing end or tail of the tubular liner to a flexible light curing activator,
(e) unsealing or unclamping the region defined in (c), thereby allowing the inversion of the remainder of the tubular liner fed through the opening in the cuff; and (f) allowing the flexible light curing activator to start a curing process while the trailing end of the tubular liner moves in a forward motion through the entire length of the hollow conduit being lined.

Optionally, on smaller diameters and short lengths, the liner can be inverted into the conduit through its entirety and a translucent bladder is then inverted in the same manner, except this inversion procedure positions the translucent bladder inside of the tubular liner already in position within the hollow conduit being repaired, by introducing gas into the translucent bladder and causing the bladder to continue its inversion inside the tubular liner. Before the trailing end of the bladder is fed through the device, the flexible light activator is powered on to initiate the curing process, as the translucent bladder inverts itself through the tubular liner and, thereby, curing and inflating, causing the tubular liner to be held tightly in place against the host pipe by the translucent bladder, while curing the liner in place all the way to the end.

In another aspect, the present invention provides a method of lining a hollow conduit with a tubular liner comprising:
(a) providing the tubular liner with a leading end;
(b) forming a cuff from the leading end of the tubular liner, the cuff comprising an opening which is positioned outside of the hollow conduit;
(c) securing and positioning the cuff of the tubular liner before a first access opening of the hollow conduit;
(d) feeding a remainder of the tubular liner through the opening of the cuff; and
(e) delivering pressurized gas through a gas inlet port into a space defined between the cuff and the remainder of the tubular liner inside a vessel or other device, while feeding the remainder of the liner through the opening of the cuff, wherein the pressurized gas exerts pressure inside the tubular liner, thereby causing inversion and inflation of the liner into the hollow conduit.

Optionally, at the halfway point of the tubular liner being inverted in the conduit, restricting a region of the liner between the cuff and the exposed liner thereby temporarily restricts the liner while the flexible light activator is attached to the trailing end of the liner. Once the restriction is removed, the gas is allowed to pass through into the liner, thereby causing inversion, inflation and curing of the liner while the remainder of the liner is inverted through to the end. Additionally, the rate of curing is regulated by controlling the speed of the trailing end of the liner as its pulling the light activator through the liner inside the conduit, maintaining or establishing a pressure in an interior portion of the inverted liner such that the pressure is sufficient to keep the liner against the inside surface of the conduit. Most preferably, another step of curing the resin in the liner is introduced, as the trailing end attached to the light activator moves through the entire liner towards the end, away from the initial starting point.

In yet another aspect, the present invention provides for a method of lining a hollow conduit with a tubular liner, for use on partial repairs or to shorter sections of conduit or for smaller diameters and short lengths of hollow conduits. The resin-lined tubular liner, in conjunction with a translucent bladder and flexible light curing activator, can be pushed or pulled into place into the hollow conduit in its entirety, and then when in position, inflating the translucent bladder with a gas, which in turn presses the tubular liner tight against the host pipe or hollow conduit wall, before the flexible light activator device, which is central positioned within the translucent bladder and host pipe, is powered up to start the curing process.

In yet another aspect, the present invention provides for a method of lining a hollow conduit with a tubular liner, wherein the liner is impregnated with a light-activated resin before the liner is inserted or placed within the conduit.

In yet another aspect of the present invention, provided herein are methods of this invention being carried out in the absence of any heat-activated resin and, therefore, the liner does not require any special cooling or large refrigerated trucks and can be installed in very hot climates without curing in advance of installation. Additionally, neither cold climates, presence of groundwater nor any extreme temperature-related issues affect the curing process. The gas is preferably air and the pressure of the gas is preferably from about 2 to about 30 pounds per square inch (psi) covering all diameters. Operation at atmospheric pressure requires a supplemental force to invert the liner or bladder.

Preferably, once the liner or bladder is fully disposed within the conduit at the halfway stage, the methods of this invention may further include the step of sealing off the entrance to the device, (e.g., with a blank plate or cap and moving the inversion apparatus and another insertion device to another location to facilitate additional installations) and then proceeding with the remaining steps of the methods. The hollow conduit can be, for example, a water or gas pipe, a storm drain, a sewer pipe, a wastewater drain, or the like.

In another aspect of the present invention, there is provided an apparatus for inverting a tubular liner or bladder in a conduit comprising:
  (a) a feeding element comprising at least one opening through which an activator is attached to a trailing end of the tubular liner or bladder before a cuff is formed from a leading end of the tubular liner or bladder; and
  (b) a temporary securing or clamping element positioned downstream of the feeding element, wherein the activator is an electric light activator tube comprising a unit of sufficient length to improve curing time and speed with a restraining cable.

Optionally, at least one spiral centralizer is attached to the outside of the activator to ensure that the electric light activator tube is in a central position relative to the conduit to cure the tubular liner as fast as possible during installation. Preferably, the electric light activator tube is flexible and also wrapped or encased with a passive reflecting tape to assist in dispersing UV light in all directions, Preferably, a braking control member is also provided, for regulating the speed of the inversion, pulling the activator through the liner or bladder and can be simultaneously viewed via a camera.

The above-described apparatus is also used to line a conduit with a tubular liner in accordance with the method of the invention. The present invention also comprises a combination of components with the above-described apparatus. The additional components include known apparatus to hold pressure and invert the liner or bladder, a viewing portal with a translucent screen and a UV protective filter built in to protect the material and yet allow an operator to observe what is contained within the device and monitor the special arrangement of the power cable that is wound or coiled on the rollers contained within the device and externally on the reel to the power restraining cable, a portable battery or power supply to provide the low power electrical supply which is connected to one end of the light activator and yet wired internally to provide power to both ends of the light activator tube, a flexible tube with a built in spiral flat portion placed at regular intervals to ensure that the flat and flexible circuit strips remain in place on the outside of the hollow tube along with the centralizers which keep the light activator tube towards the middle of the conduit even on very tight bends, while the multiple light source strips are then positioned closer to the inside of the pipe wall, a unit to generate pressurized gas, the resin impregnated tubular liner with a UV protective sleeve and a portable monitoring unit to facilitate the above method.

BRIEF DESCRIPTION OF THE DRAWINGS

The disclosed subject matter contained herein is best described in conjunction with the accompanying drawings, in which:

FIG. 4 is a schematic illustration of the method and apparatus of the invention when used in conjunction with a shorter length partial tubular liner and a smaller and shortened version of the above translucent bladder including its flexible tube, combined with its centralizers and low powered flexible light source as shown in the method of the invention.

DETAILED DESCRIPTION OF THE INVENTION

Figure 1:
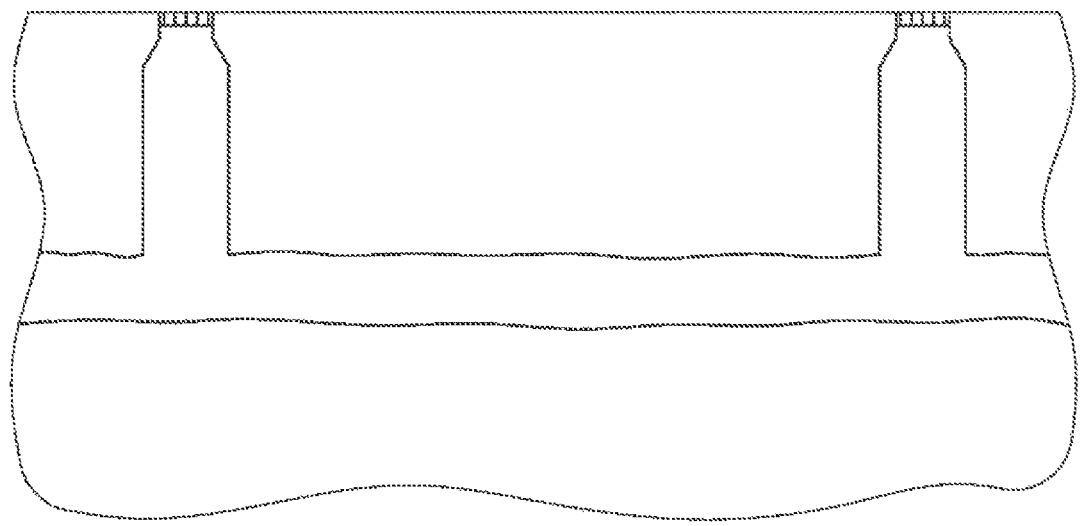
FIG. 1 shows a schematic illustration of a hollow conduit that is to be repaired using the apparatus of the present invention in a region having at least two access points.

In the method of the present invention, a UV activated resin-impregnated fabric tubing, having had its UV protective sleeve removed during the loading of the material from its transport container and into the inversion pressure drum or apparatus, the liner or bladder is drawn through the entrance of the apparatus of this invention sufficiently to allow the first few feet of the liner or bladder to be exposed inside out from the exit point of the apparatus. The first few feet of the liner or bladder to be exposed inside out from the exit point of the apparatus is preferably at least about 2 feet, more preferably from about 3 feet to about 5 feet, most preferably from about 6 feet to about 15 feet, depending on the depth of the access to the pipe or conduit.

The liner tube or bladder is secured to the apparatus and a portion of the UV protective sleeve previously removed is positioned over the area intended for the tubular liner to be inverted into (turned inside out) and thereby protecting the exposed resin impregnated fabric tubular liner from any light source exposure, the trailing end of the resin impregnated fabric tubular liner can also be protected by a UV protective sleeve and the trailing end or tail is secured or restricted to ensure that the tubular liner or bladder cannot pass beyond the apparatus exit position when the inversion starts.

With the apparatus in position, air or fluid is forced under pressure through, a vessel container or other such device thereby only allowing only air pressure, water or gas to enter into the tubular liner or bladder, causing the liner tube or bladder to expand, which in turn pulls the remaining liner or bladder through itself (inversion or eversion).

Internal pressure of the liner tube or bladder expands the material tight to the inside wall of the conduit or pipe to be repaired and is maintained by the air or fluid flowing through the apparatus into the liner tube or bladder, thereby forcing the material to conform to the shape of the existing passageway, pipeline or conduit. This same internal pressure causes the liner tube or bladder to pull the remainder of the liner tube or bladder through its own self, thereby propelling or inverting further into the passageway, pipeline or conduit. When the tube or bladder has reached the halfway stage of the intended length for the installation, the trailing or tail end of the liner or bladder that was previously restricted from passing the device is held fast halting the inversion.

A clamp or restricting device can now temporarily be applied to the exposed liner tube or bladder exterior, and adjusted as such to restrict the entrapped air gas or water from escaping out from the liner tube or bladder, a cap on the apparatus is removed, to allow the trailing end of the tubular liner or bladder, to be attached to the resin activator tube if they are housed separately, from the liner or bladder tube inversion vessel or container. A closure cap can also be applied to the device opening. The container or vessel holding the light activator source can now be attached to the apparatus or trailing end of the liner if housed separately, and still maintaining the seal of internal pressure, once attached the clamp or restricting device is removed, at the same time, optionally the liner vessel, container or other device if separate, can be removed from site, to be then used optionally at another location after reloading with another resin-impregnated fabric tubular liner or bladder.

As the liner tube or the bladders trailing end or tail, travels past the exit point or cuff of the liner or tube, the activator which is now powered on typically by low voltage dc current, and sends power to the lights in its entirety which initiates the curing sequence of the UV resin-impregnated fabric tubular tube already expanded into shape, and the short curing process begins, since the activator source is a minimum length of 30 feet, (optionally 50 to 100 feet) the inversion process can continue without stopping, as the tail or trailing end is pulling the activator throughout the entire liner installation length, curing as it moves, so that by the time the activator reaches the end of the intended installation, the resin-impregnated fabric tube is now a hardened or cured pipe without joints and from the entry point to the furthest exit position of the old pipe or conduit as needed to complete the installation.

The liner used in the present invention preferably has a thickness of at least 2 millimeters. Particularly suitable thicknesses range from about 2 millimeters up to about 18 millimeters. The diameter of the liner is at least 2 inches, with particularly suitable diameters ranging from about 3 inches to, e.g., 24 inches. Larger sizes can be accommodated by wiring more activators together and by providing more battery power.

The fabric forming the lining may be formed from at least one layer of resin absorbent material, such as felt or glass fiber or a combination of both. The resin impregnating the fabric is preferably a non VOC synthetic light activated resin, which means that it will cure with the emissions of a UV light source within a few minutes, even under water and without any environmental issues or strong odors.

Particularly suitable materials for forming conduit liners of improved strength are disclosed, e.g., in U.S. Pat. No. 6,837,273 and U.S. Published Application No. 2003/0234057, both of which are incorporated by reference herein. These references disclose fabric layers, which are sewn or bonded, and which contain a natural or synthetic fibrous material in needled, knit, woven or non-woven mat form. Suitable materials should be water- and corrosion-resistant. Examples for such fabrics include pulp fiber, hemp, cotton, and polyethylene, polypropylene, rayon, nylon and/or polyester fibers.

The references also teach that woven or non-woven glass material can be used in addition to, or as a substitute for, these other fibers.

The references further teach that the resinous impregnation liquid introduced into the fabric layers can be any number of light activated compositions. The resinous impregnation liquid becomes set or hardened by a UV light at a specific light range to activate the catalyst and provide a solid matrix around the fibers. The suitable compositions include a light-react-able agent. Such examples include ultraviolet curing unsaturated polyester or vinyl-ester or any non-VOC light activated resins, as disclosed in U.S. Pat. No. 6,170,531 (incorporated by reference herein), e.g., vinyl ester.

The method and apparatus of this invention can be used to line a conduit (e.g., passageway or pipeline) in a vertical or horizontal position and of various shapes and dimensions regardless of disposition of the conduit to be repaired or lined. Non-limiting examples of suitable conduits to be lined according to the present invention include those having a diameter of at least 2 inches, preferably from about 3 to 24 inches, and those having a length of at least 30 feet, preferably from about 30 feet to about 400 feet. However, it is to be understood that the present invention is not restricted due to the dimensions of the conduit.

The conduit to be lined preferably extends between two access locations. Alternatively the reusable translucent bladder can be used for pipes with only one access position, as the bladder will go further than the liner end, ensuring the downstream tubular liner is expanded and cured as the bladder moves through and out of the liner end.

Figure 2A:
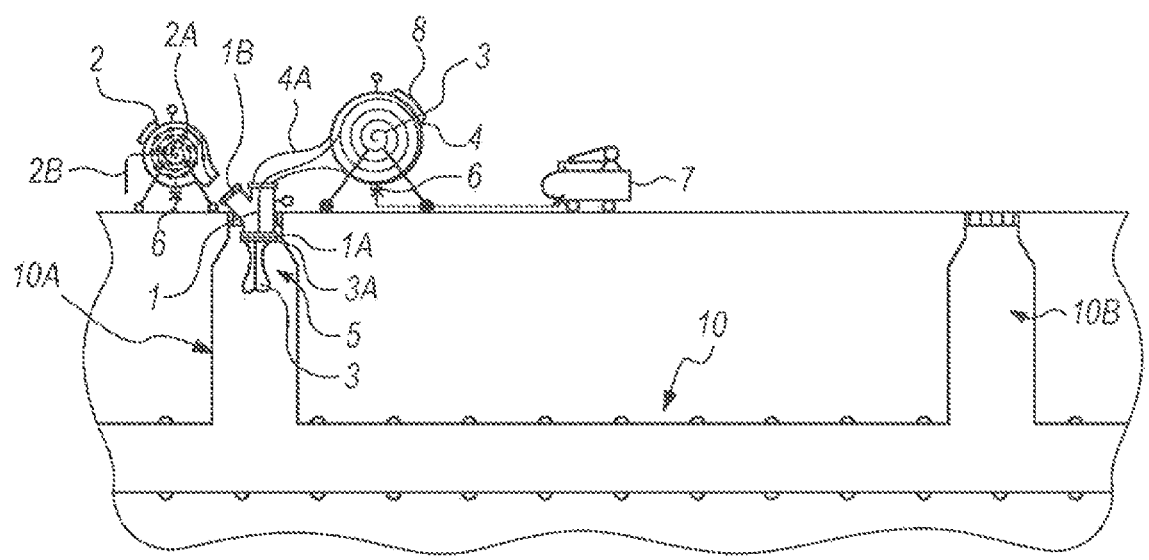
FIGS. 2A-F represent a schematic illustration of how the methods and devices of the present invention move through a standard repair, in conjunction with a tubular liner inversion only, where the lining is deployed at one access point in a two access point environment.
Figure 2B:
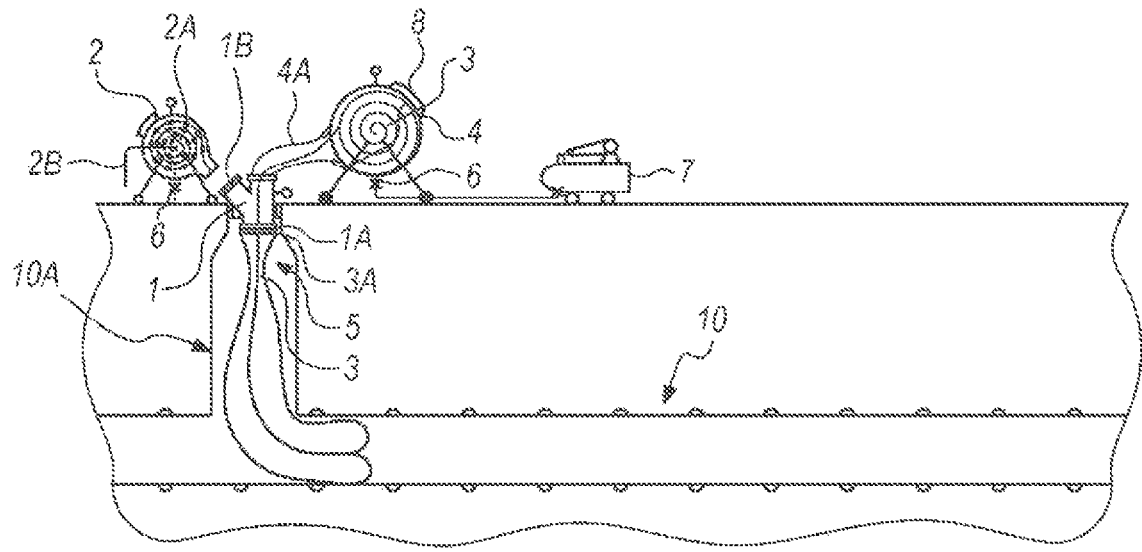

Once the liner is cured the exit and entry point or just the entry point can be cut out allowing for the activator to be retrieved or pulled back through the pipe when only one access is available, the bladder and the activator is retrieved with a minimal internal pressure of 1 psi to assist in the de-inversion process as its pulled back inside itself and out of the pipe to the cuff. Embodiments of the apparatus and system of this invention and the various stages of the methods of the present invention will now be described with reference to Stages 1 to 5, further referenced herein as FIGS. 2A-F, for larger scale installations where there are two main access points for the pipe in need of repair FIG. 1 shows a damaged conduit to be repaired or lined by the methods and devices of the present invention. FIG. 2A describes an exemplary stage 1 situation, where conduit 10 to be lined (e.g., a sewer pipe) has a first access opening in the form of manhole chamber 10A or cleanout, a second access opening in the form of manhole chamber 10B, a first vertical channel, and a second vertical channel. It is to be understood that combinations of vertical channels to conduits of various geometries and diameters can also be lined using the methods, apparatus and system of this invention.

Feeding element 4 is a conventional feeding member for receiving and feeding a resin-impregnated fabric tubular liner 3 or bladder into manhole 10A and eventually conduit 10, through entry apparatus 1. Entry apparatus 1 is located downstream of feeding element 4 and is adapted to fixedly secure an opening 1A of cuff 3A formed from a leading end of liner tube 3 or bladder, with clamping member 5 located downstream of cuff 3A and a gas-inlet connector 6 located upstream at feeding element 4 and, also, light activator unit element 2. A UV light protective sleeve 4A is shown, extending from feeding element 4 to entry apparatus 1. Preferably, feeding element 4 comprises portal 8 for viewing and transferring spent liner post-use.

Entry apparatus 1, optionally, may include a supporting frame to sit on or near manhole 10A or attached directly onto any liner feeding element 4. Alternatively, entry apparatus 1 can be located directly at the bottom of any vertical chamber or clean out within manhole 10A.

The system of this invention includes an entry apparatus 1 in combination with light activator unit element 2 or feeding element 4 as a combination of both chambers if size or volume is not an issue such as for smaller diameter installations. Light activator unit element 2, which comprises a long flexible tube encompassing a plurality of LED lights that are pre-set to a specific wavelength in order to activate the resin impregnated fabric liner as its being installed. This lightweight hollow flexible tube of lights, also has the ability to expand under pressure of an internal gas thereby allowing the tube the possibility of expanding and changing its shape when inside the liner or bladder and therefore bringing the light arrays closer to the inside wall surface to increase curing speeds. Use of a passive reflecting tape also helps to mirror the light available from the source and reflect its emissions both outwardly and longitudinally inside the pipe or conduit.

As shown in FIG. 2A, conduit 10 is reached via a cleanout or manhole 10 A, most of which are vertical shafts. Liner tube 3 is attached to feeding element 4 in preparation for installation within conduit 10. As discussed above, liner tube 3 is formed of a resin absorbent fabric or a dry bladder inflation tube and has a length that is equal to or greater than the distance between manholes 10A and 10B. Liner can be installed in increments from about 10 to about 500 feet, depending upon conduit dimensions, logistics and physical and weight demands.

Figure 8A:
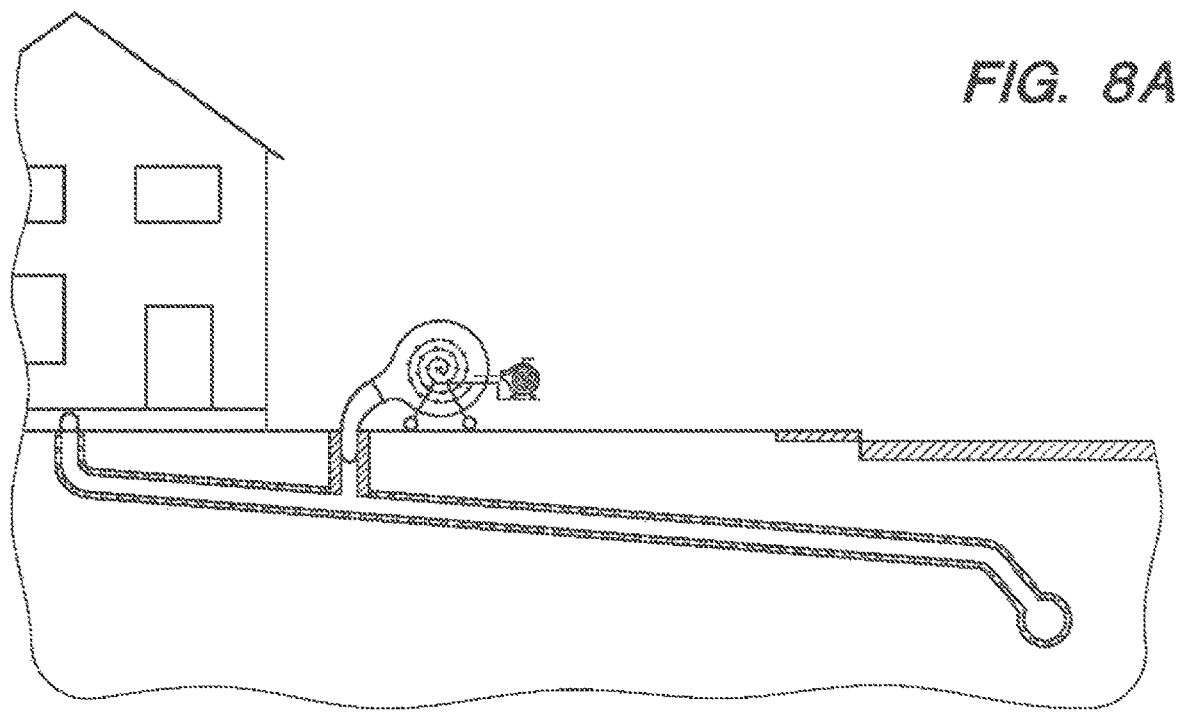
FIGS. 8A-H shows an exemplary illustration of the multistage method of a preferred embodiment of the present invention, wherein the stages move sequentially from FIG. 8A through the end of the process (shown at FIG. 8H) for smaller diameter, residential pipes.
Figure 8B:
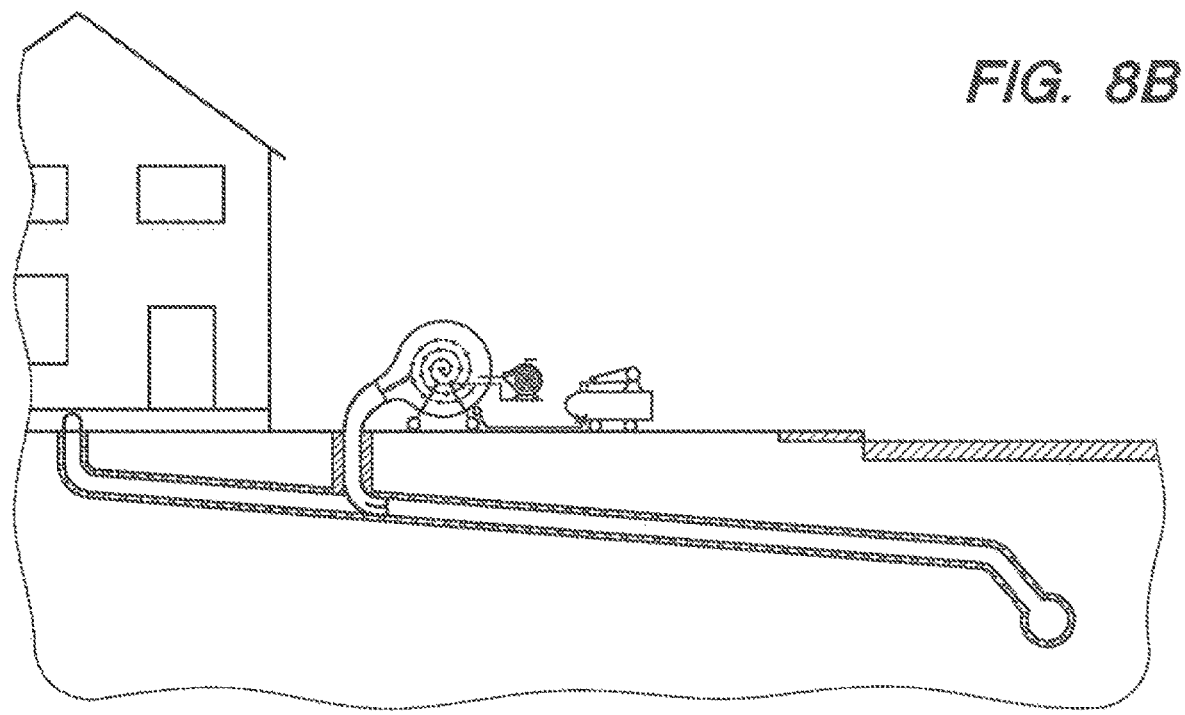
Figure 8C:
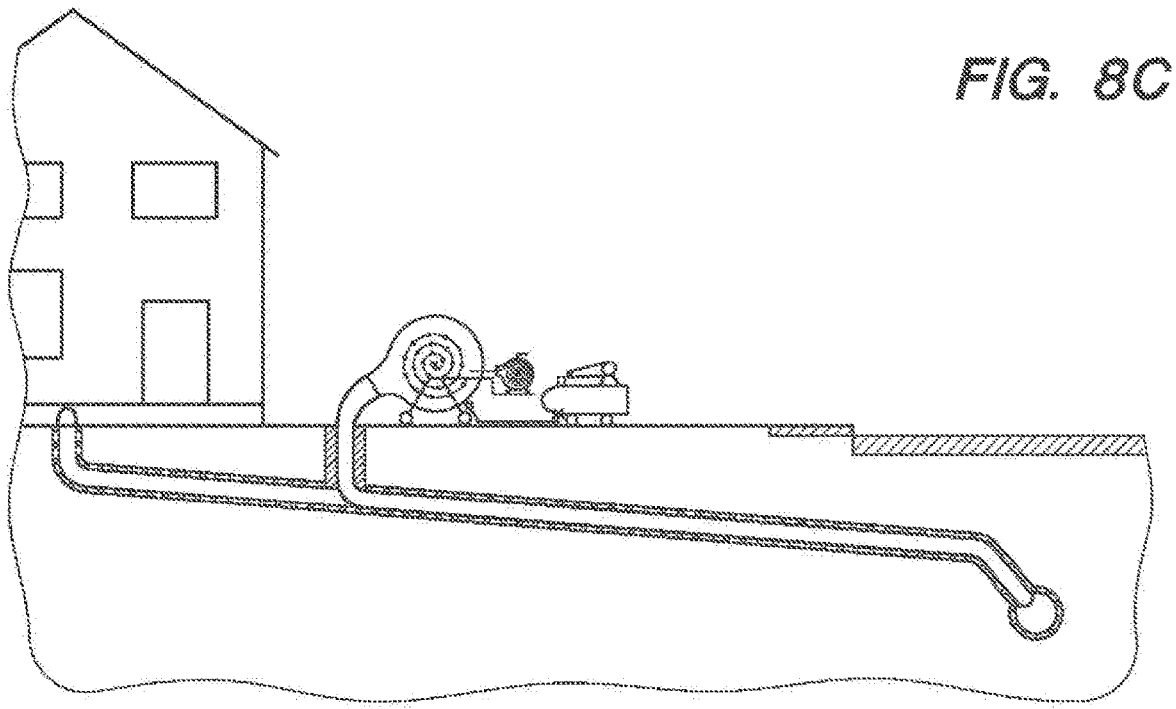

As shown in FIG. 2B, and again in FIG. 8B, a leading end of liner tube 3 is turned inside out for the first few feet to form cuff 3A over opening 1A of entry apparatus 1 or light activator unit element 2 or feeding element 4, which is then turned back over opening 1A and secured by a clamp to form cuff 3A.

The specific arrangement and design of cuff 3A is a matter of choice to those skilled in the art. Entry apparatus 1, light activator unit element 2 and feeding element 4 have openings by which liner tube 3 is first fed through to the exit point where the opening is used to form cuff 3A and secured or clamped onto entry apparatus 1 at opening 1A, or on the exit points at light activator unit element 2 and feeding element 4.

Gas-inlet connector 6 is used upstream of cuff 3A and opening 1A to entry apparatus 1, and is normally located on light activator unit element 2 and feeding element 4 to transmit air or gas from compressor 7 into liner tube 3 or bladder contained inside a preferred vessel, while feeding the remainder of liner tube 3 through cuff 3A at opening 1A, with gas, which is preferably air or steam, being introduced from a gas hose via gas inlet connector 6, through feeding element 4 and into a space on entry apparatus 1, finally delivered through liner tube 3 or bladder. Between cuff 3A and the remainder of liner tube 3, there exists a space inside the feeding element 4 and entry apparatus 1, being of equal pressure and being disposed inside liner tube 3, causing liner tube 3 or bladder to expand and pull itself from feeding element 4 and through entry apparatus 1.

The gas is fed under pressure (e.g., from about 0 to about 30 psig) and, for a 24" diameter conduit, this would typically require gas at 4-8 psig. While an 8" diameter conduit requires gas at 6-12 psi, a 4" diameter conduit may require gas up to 20 psi due to bends and restrictions.

Increased pressures are initially required to invert all liners or bladders to the halfway stage, due to the frictional forces required when entering the pipe and pulling itself through itself, thereby turning inside out. Pre-lubricants on the liner or bladder can help in this function. The gas introduced through gas in-let connector 6 is regulated by a valve to maintain pressure inside liner tube 3, thereby causing inversion and inflation of liner tube 3 into conduit 10.

Figure 2C:
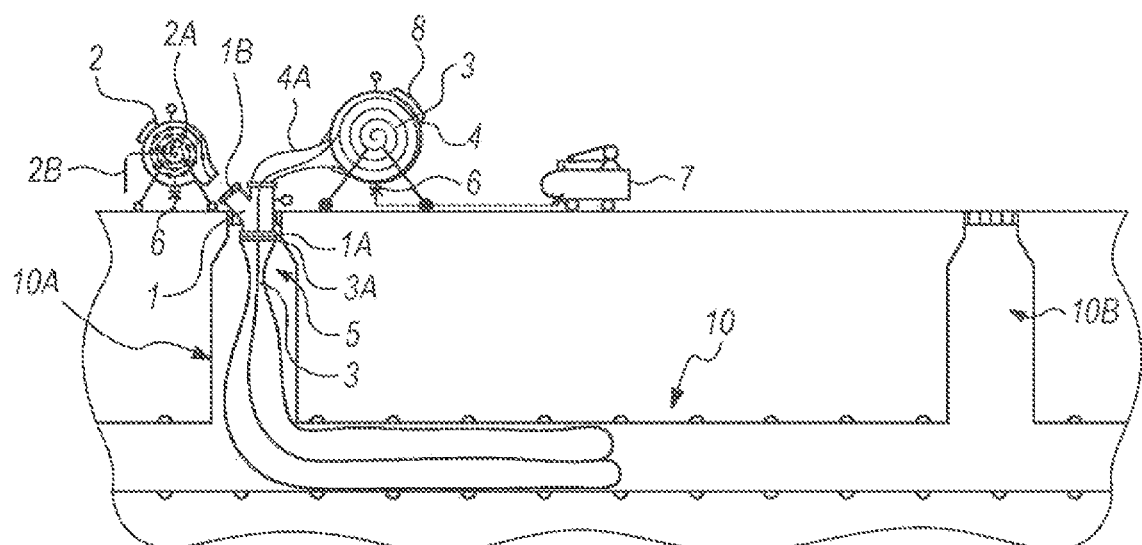

As shown at FIG. 2C, once a portion of liner tube 3 or bladder (preferably 50%) has been inverted in conduit 10, the air supply at gas inlet connector 6 on feeding element 4 is closed via clamping member 5, thereby trapping all the air inside liner tube 3 or bladder downstream of cuff 3A, since liner tube 3 or bladder has been completely dispensed out of feeding device 4.

Figure 2D:
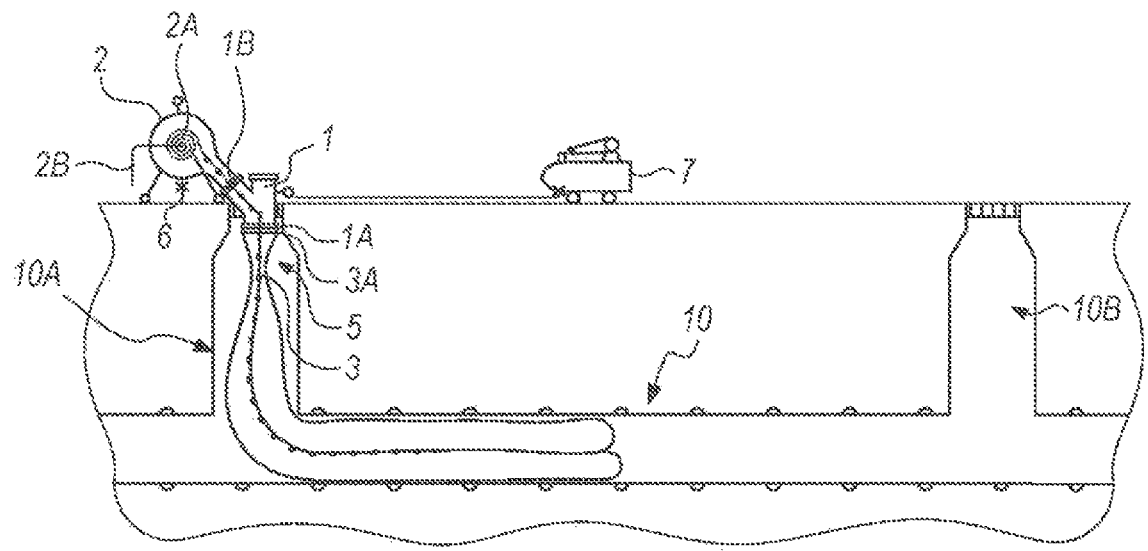

As air is exhausted out from the feeding element 4 to atmosphere, cap 1B is removed and the trailing liner tube 3 or bladder end is located and secured to activator assembly 2A inside light activator unit element 2 and through the exposed cap 1B. Light activator unit element 2 is then attached to entry apparatus 1 and optionally feeding element 4 can be removed and entry apparatus 1 is closed or capped at the location where liner tube 3 previously entered (FIG. 2D). Powered light tube 2B is activated at a time after air pressure is re-established via the other gas inlet connector 6 on light activator unit element 2. Clamping member 5 is now removed and, optionally, feeding element 4, with its tube connector and protective sleeve 4A to entry apparatus 1 may be removed to be re-loaded with another UV resin impregnated fabric liner tube or bladder for another installation elsewhere.

Figure 2E:
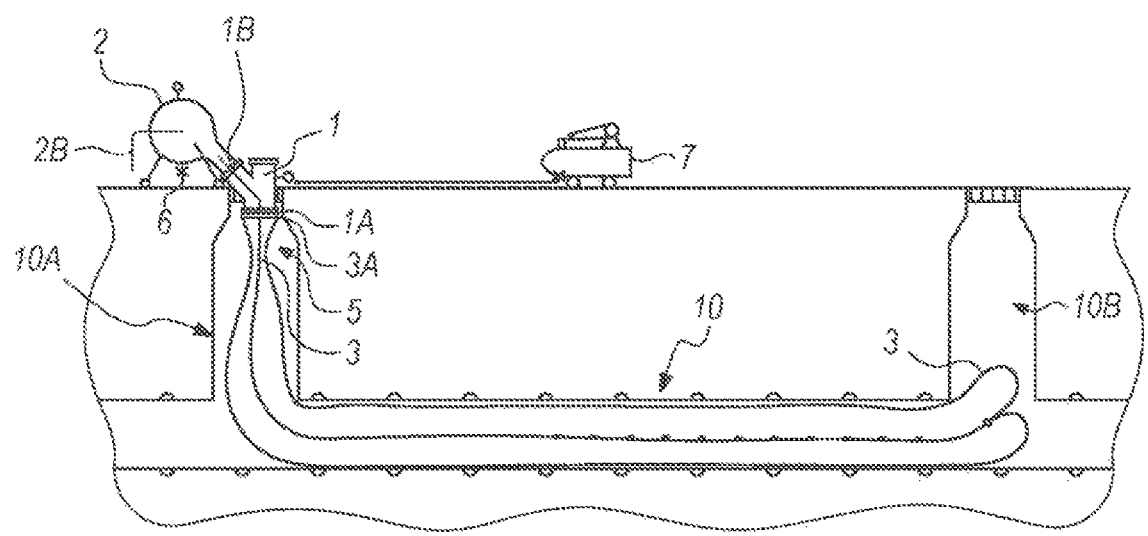
Figure 8D:
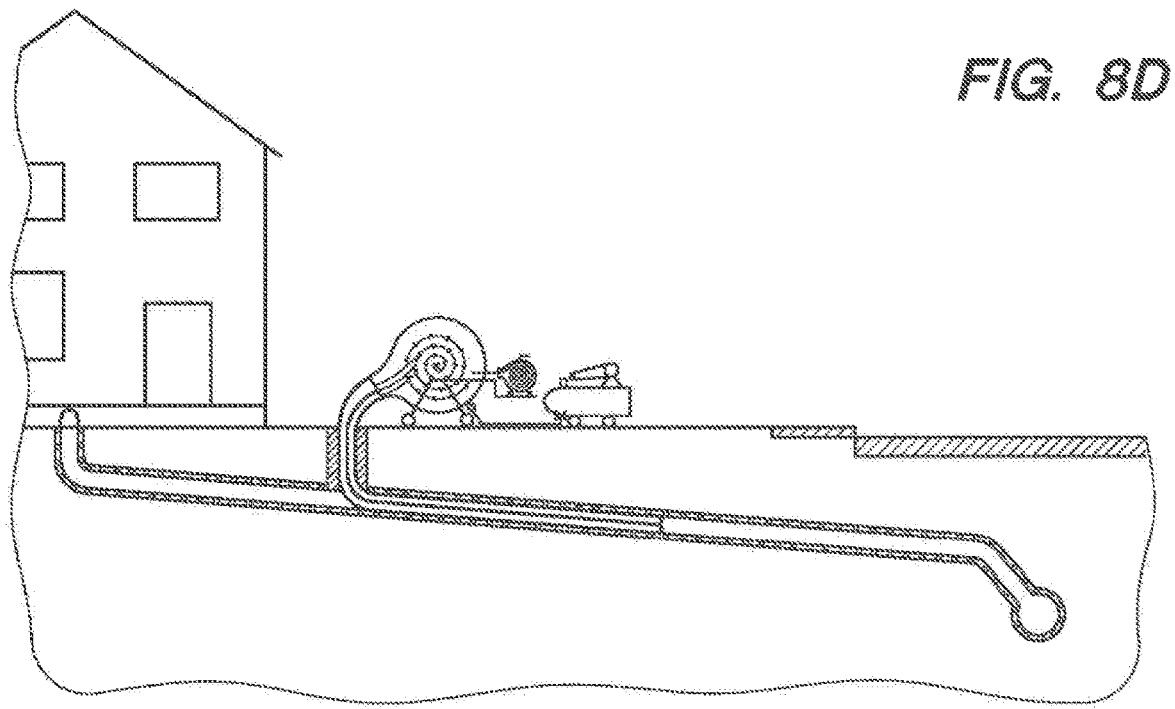
Figure 8E:
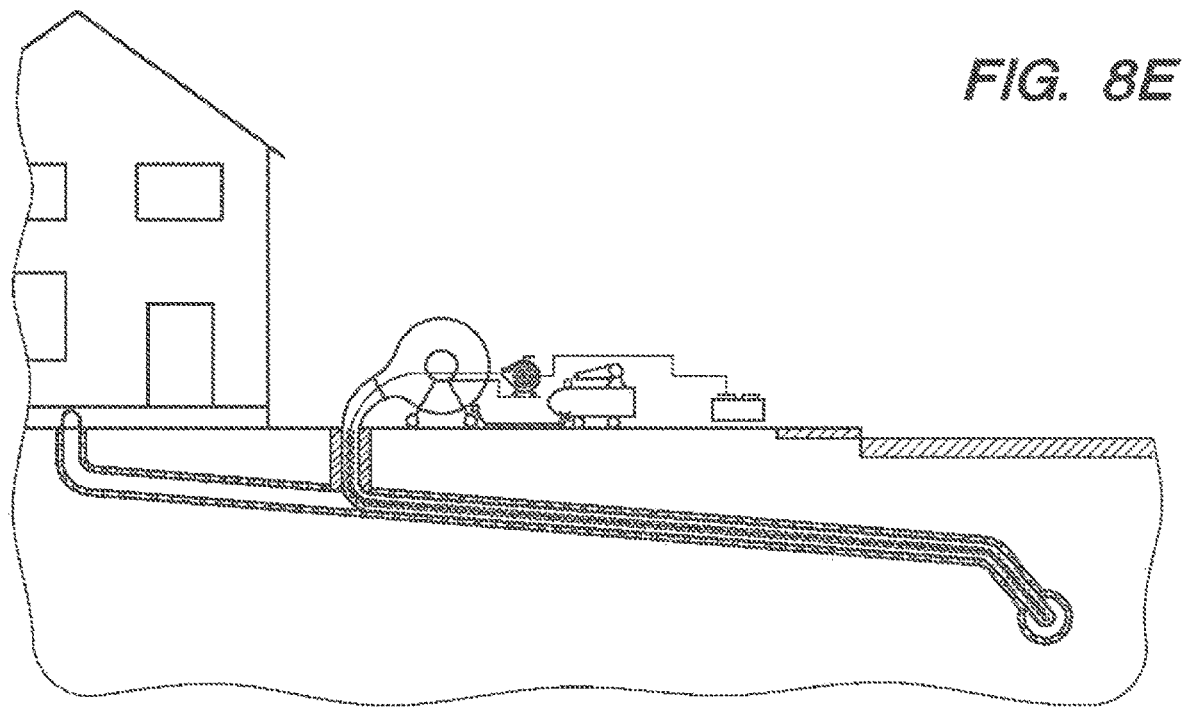
Figure 8F:
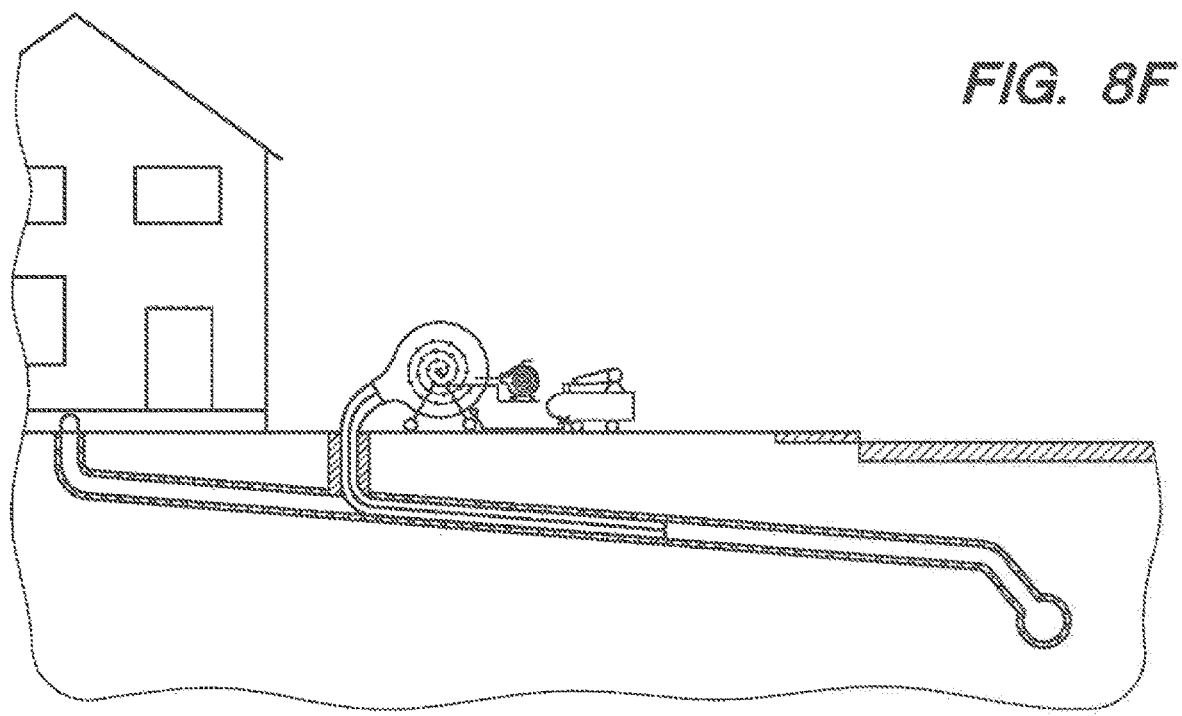
Figure 8G:
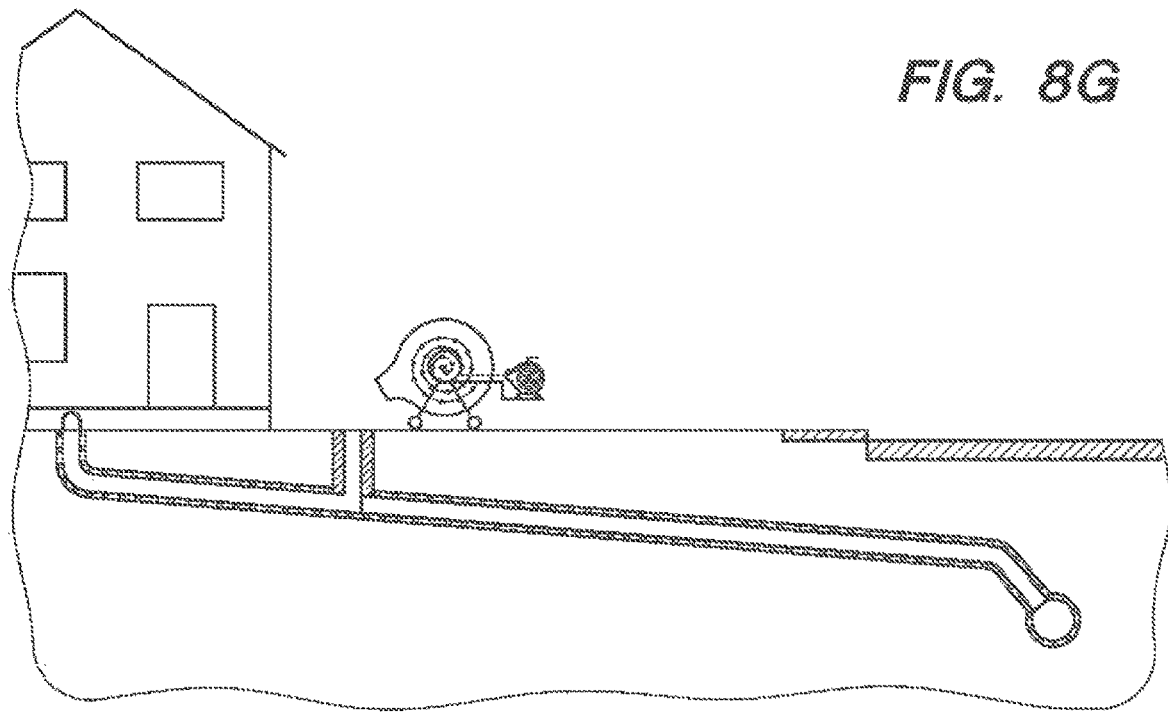
Figure 8H:
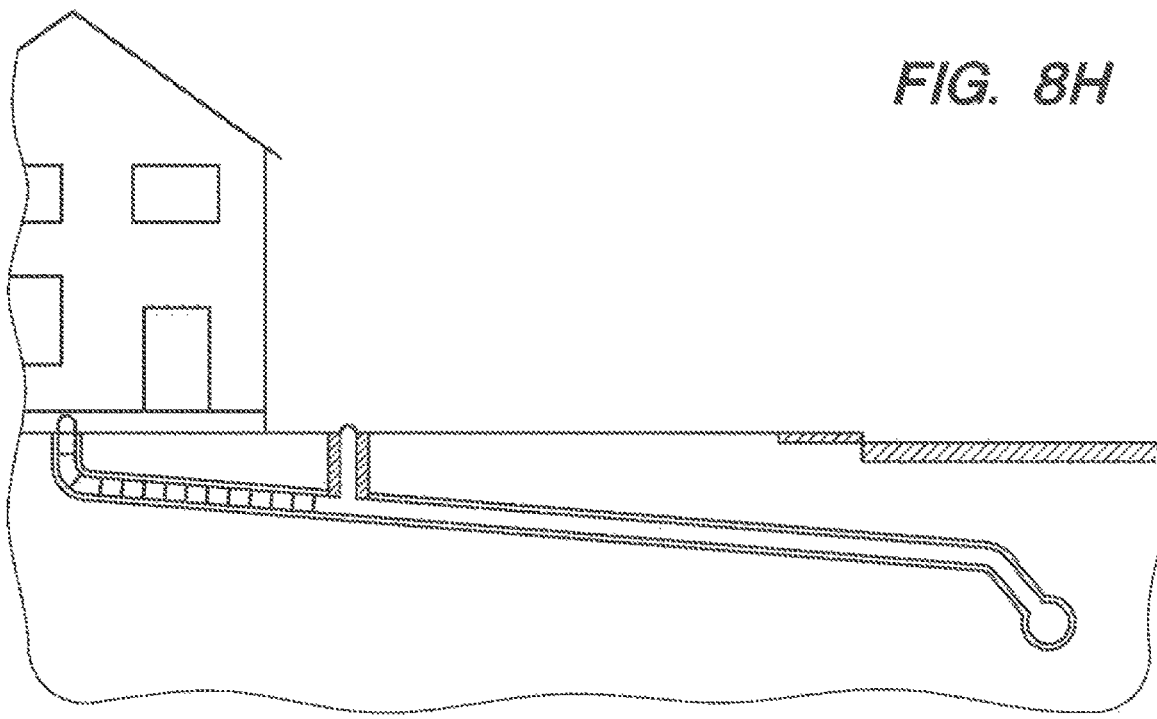

In the final stages of the methods of the present invention, as shown in FIGS. 2D-E, as well as FIGS. 8D-E, the halfway point of the inversion of liner tube 3 or bladder is now inside conduit 10 or pipeline, powered light tube 2B has been powered up and the light emission triggers the resin impregnated fabric tube to cure, while simultaneously, and under a pre-regulated speed that limits the rate of inversion, pulls activator assembly 2A through and inside itself (turning inside out) past cuff 3A until it reaches the final destination or length of the planned installation inside conduit 10 or pipeline. Optionally the activator assembly 2A can be fully positioned via the inversion technique or by pulling the combined activator and translucent bladder into position, and then inflating and powering up the powered light tube 2B to activate the curing process. Another option is to fully invert activator assembly 2A to the furthest point first, then setting the cure timing by the rate or speed of retrieval to cure liner tube 3 as necessary, all the way back to the entry point of the conduit or pipe but now in a reverse direction.

Figure 2F:
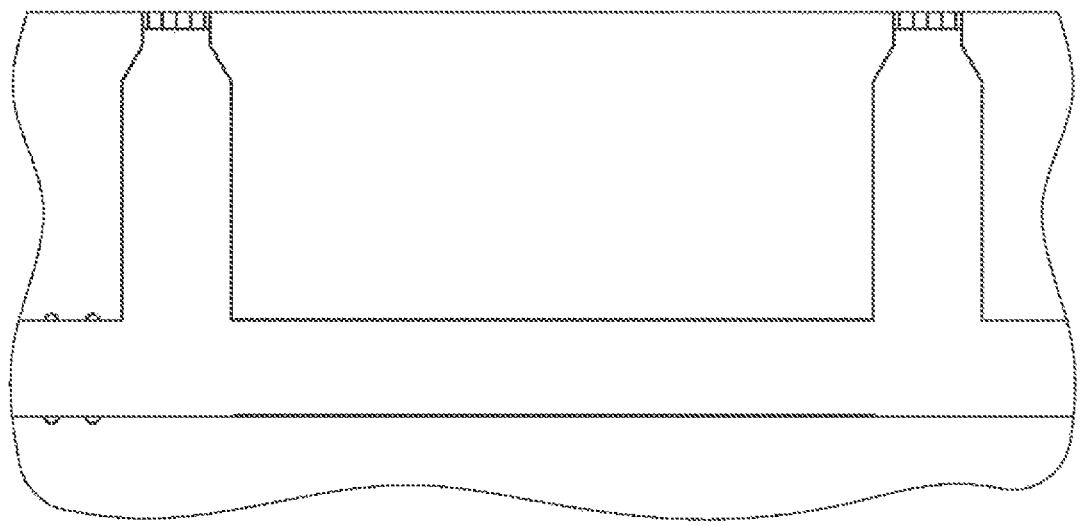
Figure 3A:
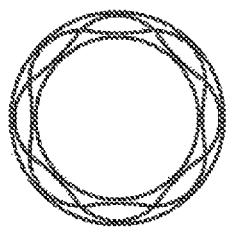
FIGS. 3A-3B show a schematic illustration of the light curing activator used in FIGS. 2A-F for larger diameter pipes (6 inch and above); 3A is considered the standard or normal position; 3B is the activator shown in an expanded position, when the device is optionally inflated.
Figure 3B:
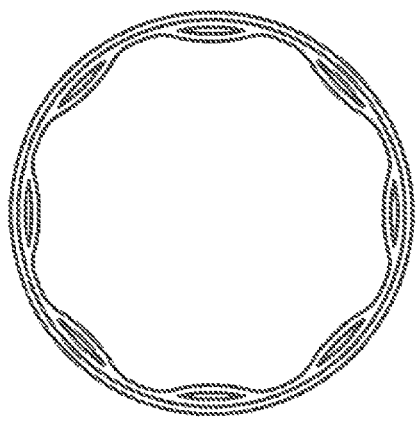

Once the curing activator has reached the final position, powered light tube 2B can be turned off and the unit retrieved from this position internally by reversing direction. If used in conjunction with a bladder or removable coating, the pressure is reduced to around 1 psig in order to assist this process and activator assembly 2A is restored into the light activator unit element 2 or other type of vessel. If activator assembly 2A was used without a bladder, then liner tube 3 is cut open at the entrance of 10B and the trailing end of the tubular liner can be disconnected from the activator tube, thereby allowing activator assembly 2A to be withdrawn manually, in reverse, and stored back inside light activator unit element 2, feeding element 4, or other container. Having completed this operation, entry apparatus 1 can also be removed and any excess liner cured in the vertical sections of 10A and/or 10B can also be cut away, leaving the shaft clear for flow to enter. When clear and complete, the leading and trailing ends of the cured liner are sealed to the inside walls of the conduit so as to prevent seepage or leakage of water or other fluid between the liner and conduit (FIG. 2F).

Once the liner is cured in place, it may be necessary to cut openings for other conduits, which intersect or join with it. This can be done using a conventional motorized cutter that can travel the conduit liner to make appropriate openings. The device can include a camera to view and record the cured liner.

The apparatus of the present invention has been described with regard to a specific embodiment. The concept present is in essence a simplification of known processes, in particular those directed to fluid (e.g., water) processes. The present design encapsulates gas to lay liner in a conduit or pipeline while at the same time allowing the light activator to start the curing process as the tail or trailing end of the tubular liner travels the length of the intended installation.

Material to the design is the inlet ports made in a stationary portion of the apparatus to allow the liner to be fed through and then cuffed at the exit point below the opening through which liner is fed, and if necessary another port to allow for the activator to enter the apparatus which can then be pulled through the tubular liner cuff by the trailing end of the tubular liner using the inversion process and without losing pressure.

Figure 5:
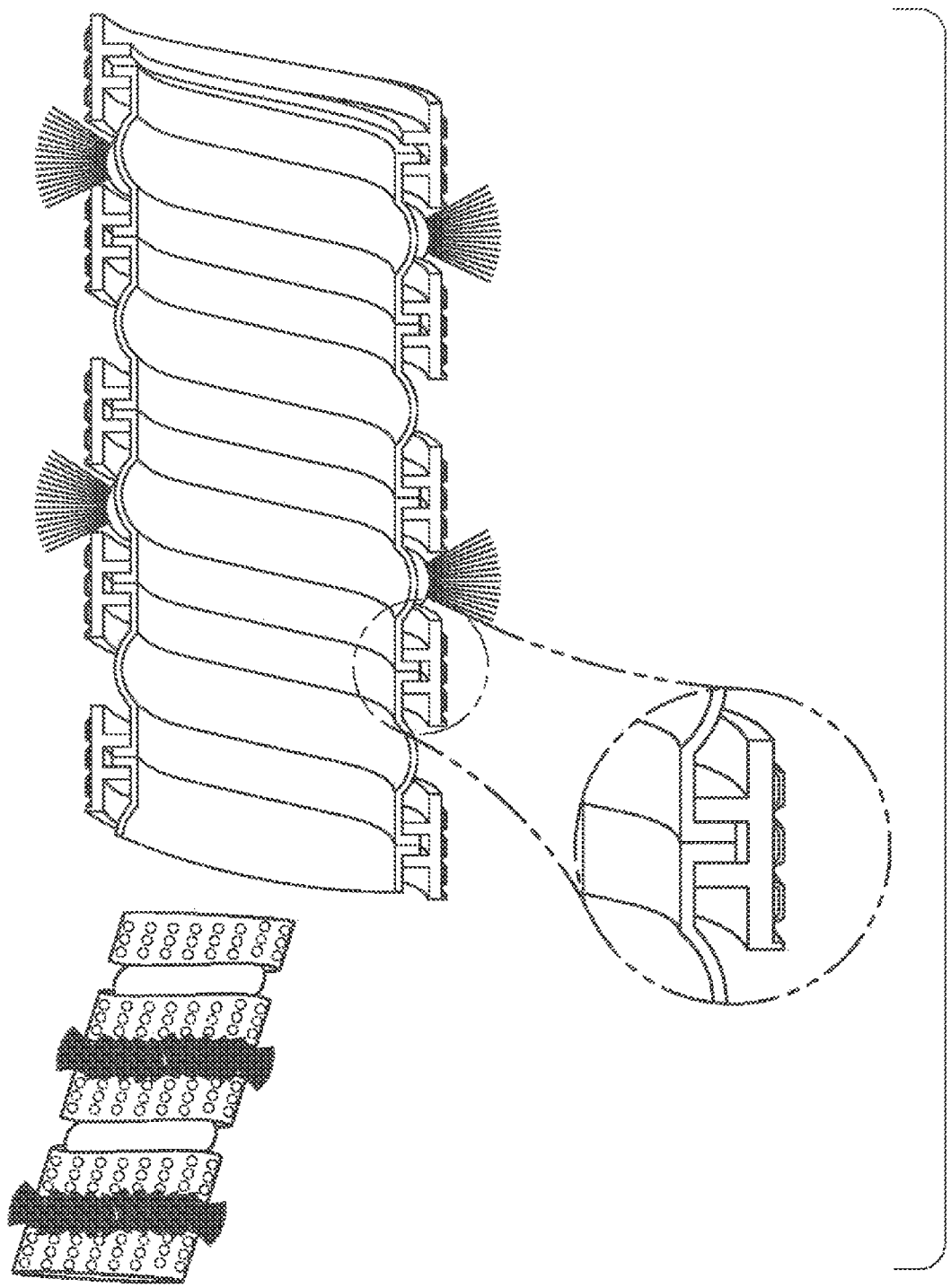
FIG. 5 is a cross-sectional and perspective illustration of the central hollow and flexible tube, showing the design, surface mounting and placement of the permanent lighting circuit strips, in addition to the spiral centralizers and their positioning, as well as the optional reflecting tape wrapped around the entire tube length.
Figure 6:
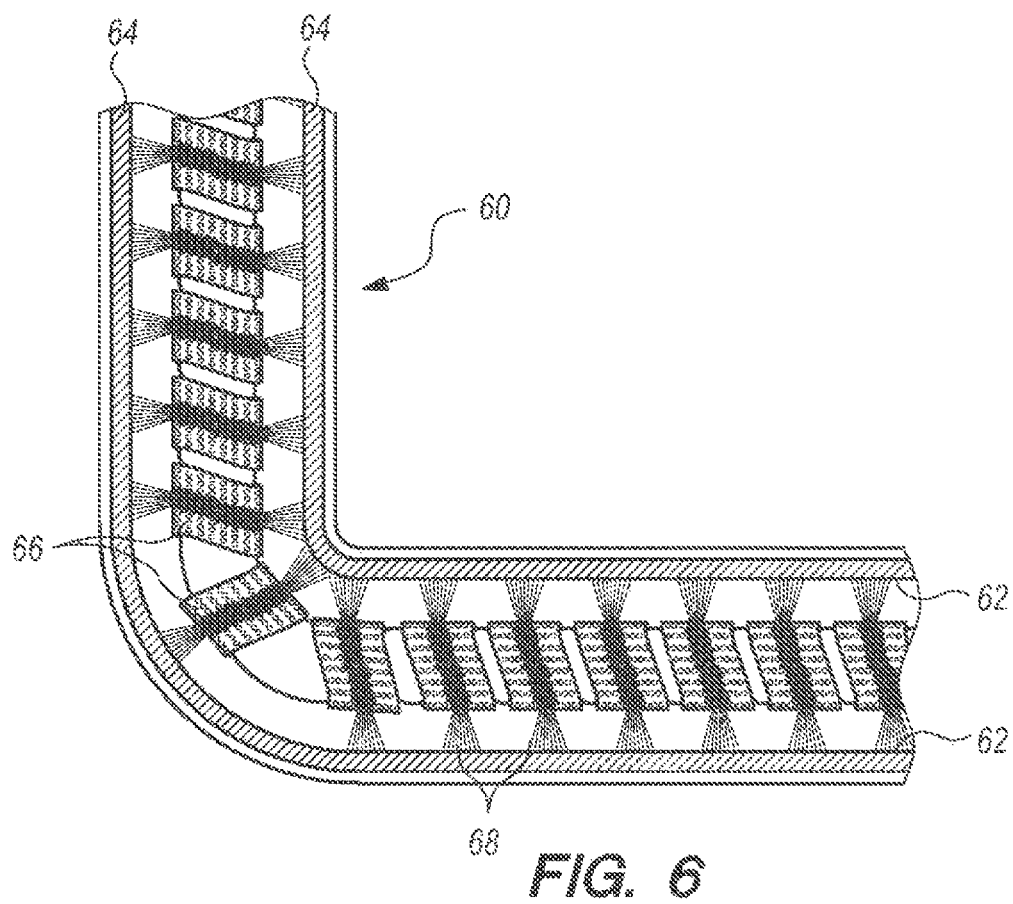
FIG. 6 is a schematic detail illustration of the flexible tube including the flexible light source circuits with the spiral centralizers while inside the translucent bladder and under gas pressure of expansion to press the UV resin saturated tubular liner tight against the host pipe and to evidence the unique positioning effect when inside a very small pipe bend.

Further material to the apparatus is the various designs of the light activator, in that the long continuous and flexible printed circuitry of a stringed arrangement of specific and multiple UV LED components which are now mounted on the flat portion of a specially designed round flexible hollow tube by a spiral or longitudinal configuration on the outside surface and yet inside a water tight translucent sleeve or tubular liner (FIG. 5). The flexible tube within an additional translucent and flexible bladder encapsulating the light activator tube may also be pressurized to inwardly expand the circuitry or deflect the flexible tube spirally to allow for more components to be attached circumferentially and in length, thereby putting the light emissions closer towards the inside diameter of a host pipe or conduit intended for lining and thereby speeding the curing process for larger diameter pipelines or conduits. In addition, the design for a micro unit of a very small diameter 1 inch and a short length of up to 12 inches has also been developed primarily for the residential and commercial plumbing markets to use within very tight access pipes (FIG. 6). The flexibility of the tube in FIG. 6 is shown, with its translucent bladder 62, multiple LED lights 66 and centralizers 68, as expanded under gas pressure on the inside of a small diameter pipe or conduit bend. As further shown, this flexible tube embodiment enables the pressing of the UV resin saturated tubular liner 64 tightly against the host pipe 60 or conduit for repair. Such a device can be negotiated through a 2 inch "P" trap to form a partial repair of approximately 4 to 6 inches in length to repair these pipes without excavation within buildings and basements in similarity to Example I. The design for the optics on each LED is through an entire 360 degrees from its axis or radial position and each led as a minimum backup led to one side or the other on the flexible circuit strip and then spread lengthwise and in a two way continuous power circuit (power is supplied to both ends of the activator tube) on lengths normally at a minimum of 5 feet for partial repairs, and a minimum of 50 feet, preferably a 100 feet for bigger diameter pipes. Due to the stress, fatigue and harsh conditions that the entire activator and tube must endure, the overpopulation of LED lights has been designed into the system so that if 1 or 2 LED lights fail for any reason the liner will still cure with just one or more remaining LED light, in addition the optional use of the reflecting tape wrapped around the flexible tube, more than doubles the intensity of the available light emissions within an enclosed pipe or conduit.

Figure 7:
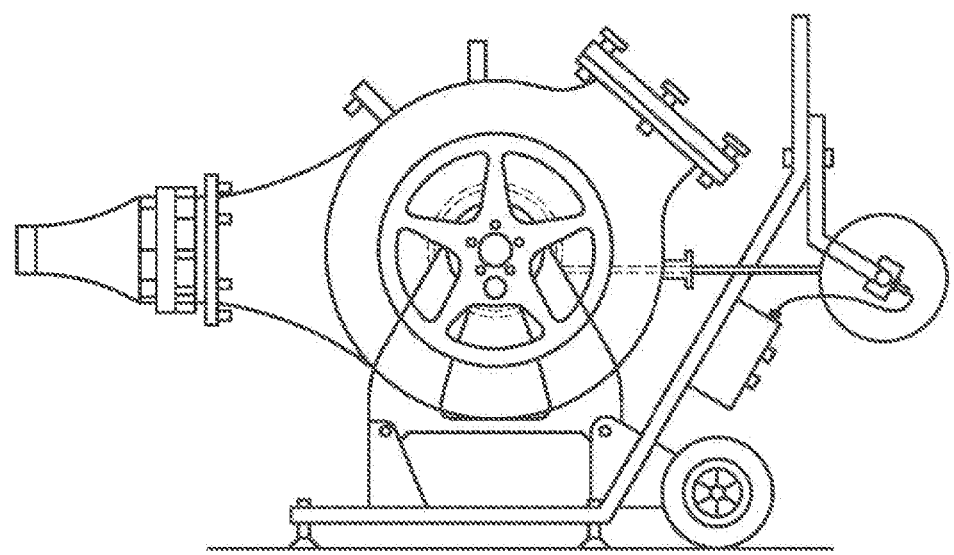
FIG. 7 shows the inversion vessel of the present invention.

FIG. 7 provides for an alternative embodiment of the devices of the present invention. As shown in FIG. 7, a combination pressure and power inversion vessel is provided for tubular liner combined with the device of FIG. 5 and FIG. 6.

Figure 9:
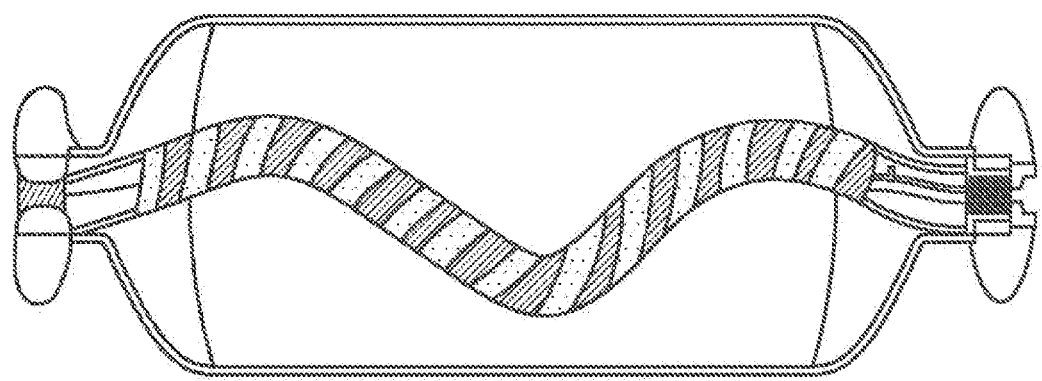
FIG. 9 is an illustration of a small diameter packer showing the displacement to the flexible tube inside the encapsulation and the coiling effect even with tethers connecting each end.
Figure 10:
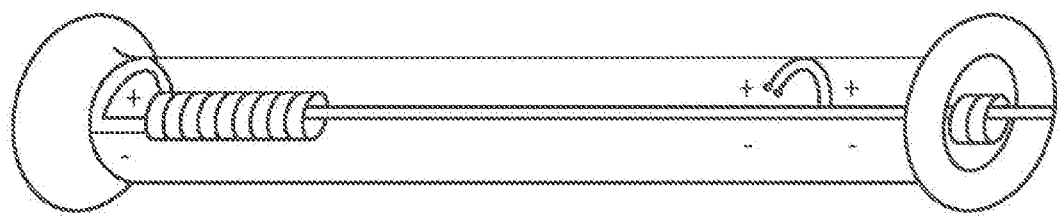
FIG. 10 is a simple wiring diagram showing the flexible light activator and evidencing a preferred wire arrangement to both ends for both power consumption and rotational use as an option.
Figure 11:
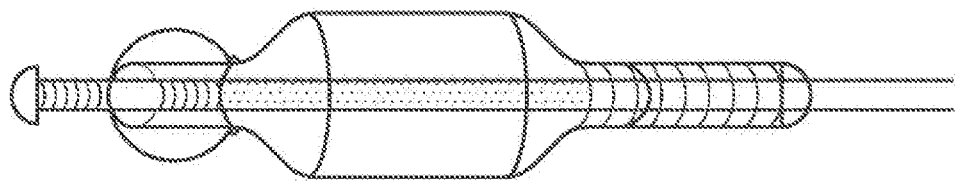
FIG. 11 is a schematic illustration to show a miniature version of the light activator, inside a micro packer inflation device for very small diameter pipes.

FIG. 9 describes a device for use in a small diameter pipe, showing an inflated translucent packer. FIGS. 10 and 11 show the wiring connections within the tubing for use in small diameter pipe applications.

EXAMPLES

The following examples describe specific methods within the scope of the present invention for lining or rehabilitating a pipeline or portion thereof. Each of the methods used a lining apparatus with variations and portions of the scope of the present invention. In each Example, prior to lining, the pipeline was temporarily removed from service and plugged or capped or (i.e., bypassed) by plugging the pipeline one section upstream of the work area and pumping all flows overland to one section downstream of the work area. The pipe to be lined was cleaned prior to installation of the liner.

Example I

The most recent example and use of the apparatus and method of the invention occurred at a private residence in Phoenix Ariz. where the climatic conditions precluded the use of a thermal cure process. The contractor a large private plumbing company had entered into a contract to repair approximately 24 feet of old 3 inch cast iron sewer pipe that had failed in several locations along the bottom of the pipe, allowing for raw sewer to flow underneath the house foundations and when the flows backed up other services had to be called in to clean the inside of the home in question. The contractor had chosen a spray type of process initially to fix the problems encountered however during the descaling and additional prep-work needed to help restore the old cast iron pipe, further damage ensued causing more holes to form only this time their positions were closer to the top of the pipe or at the 12 o'clock position.

To solve this problem, three separate partial tubular liners were put into place, rather than line the entire length due to the fact that several other connecting secondary pipes fed into the same main sewer under the building and the additional disruption and costs associated with lining over a connection would result in having to excavate under the flooring or in the walls. The methods and equipment, as detailed previously, were selected and utilized together with a combination push/power hose attached to an enclosed translucent enclosed bladder as shown in FIG. 4, with the exception that the unit was deployed upstream and going underneath the property proximate to a small pit excavated for waste and ingress/egress. t A camera was pushed to the furthest repair point needed in order to measure the length of repair required, which was to be approximately 3.5 feet by 3 inch in diameter. Once the camera was removed and the exact measurements transferred to the push hose and device, under a light protective canopy in the back yard and in temperatures away above 100 degrees, the protective sleeve encasing the raw materials for which we had previously saturated a UV resin was removed, prior to using, as the tube was cut to the required length needed. The protective sleeve was resealed for the remaining rolls of resin saturated material, the wet material was placed around the outside of the device and rolled it into as tight a position. A few elastic bands were applied to help retain the circular shape and in consistent with keeping the device as small as possible, the device was then inserted into a flexible UV resistant tube and taken to the pit to be pushed into the pipe while at the same time removing the protective tube, once in the pipe the device was pushed very easily up to the required position navigating a few bends along the way. At the correct length position known from the previous measurements and being confirmed by pushing the video inspection camera inside the pipe to the back of the device and monitoring the device, the air supply which feeds through the push/power hose and special connectors, was turned on and set at 12 psi. In a few seconds the bladder on the device had expanded, thereby pushing the resin liner tight to the host pipe and covering the damaged area. Once the bladder could not be moved forward or backward, the low power supply from the battery unit was engaged and current was transmitted inside the same single push/power hose, which in turn powered the UV LED circuit inside the device.

Within three minutes, the liner had cured to form a new section of pipe albeit a partial length remotely placed underground and beneath the home. The power was turned off at this time and the air supply was extinguished and the connection to the small compressor opened to atmosphere allowing air previously trapped in the bladder to escape. Within seconds, the bladder was free from its expanded state and the device removed from the new pipe section. The video inspection camera was again deployed to verify the repair was successful and that the broken section had been now covered by the structural repair cast in place. The device and materials were used over the next 45 minutes to complete two more repairs in the same pipe using the same procedure and equipment as described above. By all accounts, this is the first time a pipe repair for this small of a diameter has been completed using a UV resin and an LED low power light activator in the USA.

Example II

Another example of the method and a part of the device of the invention occurred at a location underneath a major highway within San Diego County. This involved a major problem associated with a small, 10 inch diameter storm drain of approximately 120 feet in length that ran under a very busy intersection. The traffic diversionary problems encountered with this location and multiple lanes with heavy traffic flows required an alternative pipe rehabilitation method, as this had to be completed on site and as fast as possible and in high elevated temperatures. This highlighted the known issues in the present state of the art in this field of technology, including problems such as the methods and procedures for such an operation cannot occur all at the same time, the pipe needed extensive cleaning which could take several hours in order to prepare the pipe for a repair, the actual reason for the repair or the cause could not be clarified since the inspection cameras could not get through the pipe, and there was no desire to claim responsibility to pay for the equipment labor and material costs, without a guarantee that the pipe could actually be repaired without excavating the entire intersection. Specialty contractors on pipe rehabilitation were unwilling to take the risks associated with the time allowed to actually work on the site while not knowing if indeed any possible payment could be applied without knowledge of what accounting method could be used in this issue, as they had deemed it an emergency. For which the owner already had a contractor under obligation as an emergency contractor. None of the known pipe rehabilitation contractors were recommended due to the high costs and the extensive, unknown risks involved, or even if the pipe could be repaired internally. Not one manufacturer of material for use with pipe rehabilitation was willing to resin impregnate a tubular liner with a thermo-setting resin, without knowing how much time was available to hold the liner inside a costly refrigeration truck. Additionally, no contractor was willing to take the risk of having all the material ready and available on site for a thermal cure, ambient resin mix and installation type of operation, when nobody could confirm the true internal diameter or its real length, or if the pipe could actually be repaired internally without trenching.

The methods and devices described supra were utilized to solve this problem, starting late at night, which meant the UV resin liner could be removed without canopies or UV protective sheeting. The tubular liner was loaded into the device as described within this invention and some of its methods as shown in FIGS. 2A-2F. Within 25 minutes, the tubular liner was attached to the power cable and inverted through to the other catch basin located in the median of the freeway. Shortly thereafter, the apparatus was inside the liner and, after 10 more minutes, the speed of inversion was calculated and set to move forward at approximately 12 feet per minute.

Example 3

Another example of the benefits of the methods and devices of the present invention occurred at a canyon location. A number of storm drains had been designated for repair using the standard cured-in-place-pipe (CIPP) process. However, the contract was severely delayed from all bidding due to local fires and eventually the project was withdrawn due to an unforeseen issue that occurred in another location within the county, whereby a previously lined storm drain that had been repaired with a CIPP liner product caught fire and, consequently, the fire spread underground up through the storm pipe and appeared in an area where the fire personnel had previously thought the home was safe from issues. As a result of these circumstances and after the county had reviewed all options, the revised specifications would only allow resin impregnated liners that had a 50% minimum additive of a highly specialized fire retardant as part of the resin mix used within the tubular liners. As a direct consequence of this, the traditional thermal cured resins were unable to perform under such conditions, since the additive had an adverse affect when trying to cure the product using heat. The devices and methods of the present invention were used, all without the need to gain entry or send personnel and equipment to the downstream location of this particular storm drain. As per the previous example, the pipe turned out to be 10 inches in diameter and was 340 feet in length. A part of the apparatus within the method of this invention was used similarly to what is shown in FIGS. 8A-H. A decision was made to push the liner into place using its steep inclination and a lot of lubrication, and a camera was sent down the pipe to both confirm the exact length and to ensure the pipe was clean. The UV resin saturated tubular liner encased with a UV protective sleeve was laid flat out flat on the road and measured for the exact length required, the liner was cut to length with the exposed ends being sealed immediately following the cut for protection against light, the excess material was placed back in its transportation box. After erecting a UV light protective canopy, the tubular liner was loaded onto the pipe and allowed to slide down the incline using some more lubrication and water, when the liner finally reached the downstream end which took approximately 40 minutes, a clear translucent tubular coating was inverted into the pipe, at the halfway position, the air being evacuated, a small light device was attached to the trailing end or tail of the coating the inversion began again and at 2 psi the coating had pulled the light train into place at the far end, we increased the pressure to 3 psi turned on the high power to the lights and set the retrieval speed after 10 minutes to 12 feet per minute, after retrieving the equipment the video inspection camera was deployed to see the final cured product of one continuous liner now in place in the canyon.

The apparatus and method of this invention can be used for the installation of any cured-in-place dry liner product, once impregnated with a light sensitive resin material and delivered to site, inverted, pulled or pushed into place or into any conduit (e.g., manhole, pipeline, or vertical shaft) used to convey fluids or gas. In the method of the present invention, the length of time required for installing and curing the liner will depend on a variety of factors, such as, e.g., thickness and diameter of the liner, the size and capacity of the air supply, the size and length and of the light activator.

The invention illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and sub-generic groupings falling within the scope of the generic disclosure also form part of these inventions. This includes the generic description of each invention with a proviso or negative limitation removing any subject matter from the genus, regardless of whether or not the excised materials specifically resided therein.

In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of ordinary skill in the art upon reviewing the above description. The scope of the invention should therefore, be determined not with reference to the above description, but should instead be determined with reference to the appended claims, along with the full scope of equivalents to which such claims are entitled. The disclosures of all articles and references, including patent publications, are incorporated herein by reference.

It will be apparent to those skilled in the art that numerous modifications and variations of the described examples and embodiments are possible in light of the above teaching. The disclosed examples and embodiments may include some or all of the features disclosed herein. Therefore, it is the intent to cover all such modifications and alternate embodiments as may come within the true scope of this invention.

The invention claimed is:

1. A method for repairing a portion of a hollow conduit having a wall, said method comprising:
   taking a bladder having a light activator positioned therein, wherein the light activator has a light activator first portion, a light activator second portion, and multiple light source strips wrapped around a flexible member in a spiral configuration, the multiple light source strips include a first light strip positioned at the light activator first portion having a first wiring connection and a second light strip positioned at the light activator second portion having a second wiring connection;
   impregnating a liner with a light-activated resin;
   forming a repair assembly by positioning the liner on the outside of the bladder;
   operatively attaching the light activator to a power hose to provide power to the light activator from an electrical power source;
   pushing or pulling the repair assembly into the hollow conduit;
   expanding the bladder using fluid pressure to urge the liner toward the wall of the hollow conduit;
   activating the first light strip by providing power through the first wiring connection to help initiate curing of the light-activated resin; and activating the second light strip by providing power through the second wiring connection to help initiate curing of the light-activated resin.

2. The method of claim 1 wherein the power hose further includes a fluid conduit, and the step of expanding the bladder further comprises providing fluid pressure through the fluid conduit to expand the bladder and urge the liner toward the wall of the hollow conduit.

3. The method of claim 1 further comprising allowing the light-activated resin to cure and harden.

4. The method of claim 3 further comprising removing the bladder and the light activator from the hollow conduit.

5. The method of claim 1 further comprising positioning a flexible UV resistant member over the liner to help prevent premature curing of the light-activated resin impregnated in the liner.

6. The method of claim 1 wherein the step of operatively attaching the light activator to the power hose is performed before the step of forming the repair assembly.

7. The method of claim 1 wherein the repair assembly is pushed or pulled into the hollow conduit by pushing or pulling the power hose.

8. The method of claim 1 wherein the light activator first portion is proximate a light activator first end and the light activator second portion is proximate a light activator second end, and wherein the light activator has an intermediate portion between the light activator first end and the light activator second end, the method further comprising activating at least one of the multiple light source strips at the light activator intermediate portion by providing power through a third wiring connection.

9. The method of claim 8 wherein the light activator further comprises an internal pathway extending through the light activator first portion, and the method further comprises providing power through the internal pathway to the second wiring connection to provide power to the second light strip.

10. The method of claim 1 wherein the fluid pressure is air pressure.

11. A method for repairing a portion of a hollow conduit having a wall, said method comprising:
taking a bladder having a light activator positioned therein, wherein the light activator has a light activator first portion, a light activator second portion, and multiple light source strips wrapped around a flexible member in a spiral configuration, the multiple light source strips include a first light strip having a first wiring connection and a second light strip having a second wiling connection;
impregnating a liner with a light-activated resin;
forming a repair assembly by positioning the liner on outside of the bladder;
operatively attaching the light activator to a power hose to provide power to the light activator from an electrical power source;
pushing or pulling the repair assembly into the hollow conduit;
expanding the bladder using fluid pressure to urge the liner toward the wall of the hollow conduit;
activating the first light strip by providing power to the first wiring connection through a first wire and activating the second light strip by providing power to the second wiring connection through a second wire, the second wire extending internally along the light activator from the first portion to the second portion;
allowing the light-activated resin to cure and harden; and
removing the bladder and light activator from the hollow conduit.

12. The method of claim 11 wherein the power hose further includes a fluid conduit, and the step of expanding the bladder further comprises providing fluid pressure through the fluid conduit to expand the bladder and urge the liner toward the wall of the hollow conduit.

13. The method of claim 11 further comprising positioning a flexible UV resistant member over the liner to help prevent premature curing of the light-activated resin impregnated in the liner.

14. The method of claim 11 wherein the step of operatively attaching the light activator to the power hose is performed before the step of forming the repair assembly.

15. The method of claim 11 wherein the light activator first portion is proximate a light activator first end and the light activator second portion is proximate a light activator second end, and wherein the light activator has an intermediate portion between the light activator first end and the light activator second end, the method further comprising activating at least one of the multiple light source strips at the light activator intermediate portion by providing power through a third wiring connection.

16. Method for repairing a portion of a hollow conduit having a wall, said method comprising:
taking a bladder having a light activator positioned therein, wherein the light activator has a light activator first portion, a light activator second portion, and multiple light source strips wrapped around a flexible member in a spiral configuration, the multiple light source strips include a first light strip having a first wiring connection and a second light strip having a second wiring connection;
impregnating a liner with a light-activated resin;
forming a repair assembly by positioning the liner on the outside of the bladder;
operatively attaching the light activator to a power hose to provide power to the light activator through a wire from an electrical power source, wherein the power hose includes a fluid conduit;
pushing or pulling the repair assembly into the hollow conduit;
expanding the bladder by directing fluid pressure through the fluid conduit to urge the liner toward the wall;
activating the first light strip by providing power through the first wiring connection to help initiate curing of the light-activated resin proximate the light activator first portion;
activating the second light strip by providing power through the second wiring connection to help initiate curing of the light-activated resin proximate the light activator second portion;
allowing the light-activated resin to cure and harden; and
removing the bladder and light activator from the hollow conduit.

17. The method of claim 16 wherein the step of operatively attaching the light activator to the power hose is performed before the step of forming the repair assembly.

18. The method of claim 16 wherein the light activator further comprises an internal pathway extending through the light activator first portion, and the method further comprises providing power through the internal pathway to the second wiring connection to provide power to the second light strip.

19. A method for repairing a portion of a hollow conduit having a wall, said method comprising:

taking a bladder having a light activator positioned therein, wherein the light activator has a light activator first portion having an internal pathway extending therethrough, a light activator second portion, and multiple light source strips wrapped around a flexible member in a spiral configuration, the multiple light source strips include a first light strip having a first wiring connection and a second light strip having a second wiring connection, the first wiring connection and the second wiring connection positioned at different locations along a length of the light activator;

impregnating a liner with a light-activated resin;

forming a repair assembly by positioning the liner on the outside of the bladder;

operatively attaching the light activator to a power hose to provide power to the light activator from an electrical power source, wherein the power hose has a fluid conduit;

pushing or pulling the repair assembly into the hollow conduit;

expanding the bladder by forcing fluid pressure through the fluid conduit to urge the liner toward the wall;

activating the first light strip by providing power through a first wire to the first wiring connection to help initiate curing of the light-activated resin; and activating the second light strip by providing power through a second wire positioned in the internal pathway to the second wiring connection to help initiate curing of the light-activated resin;

allowing the light-activated resin to cure and harden; and removing the bladder and light activator from the hollow conduit.

20. The method of claim 19 wherein the step of operatively attaching the light activator to the power hose is performed before the step of forming the repair assembly.

21. The method of claim 19 wherein the light activator first portion is proximate a light activator first end and the light activator second portion is proximate a light activator second end, and wherein the light activator has an intermediate portion between the light activator first end and the light activator second end, the method further comprising activating at least one of the multiple light source strips at the light activator intermediate portion by providing power through a third wiring connection.

\* \* \* \* \*